(12) United States Patent
Kaito

(10) Patent No.: US 7,644,605 B2
(45) Date of Patent: Jan. 12, 2010

(54) EXTERNAL FORCE DETECTION METHOD, EXTERNAL FORCE DETECTOR AND ELECTRONIC DEVICE

(75) Inventor: Yoshihiko Kaito, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 12/076,782

(22) Filed: Mar. 21, 2008

(65) Prior Publication Data

US 2008/0210019 A1 Sep. 4, 2008

Related U.S. Application Data

(63) Continuation of application No. PCT/JP2005/017514, filed on Sep. 22, 2005.

(51) Int. Cl.
G01M 7/08 (2006.01)
G01L 1/06 (2006.01)

(52) U.S. Cl. .................. 73/12.01; 73/862.53; 200/61.08

(58) Field of Classification Search ............... 73/12.01, 73/862.53; 200/61.08
See application file for complete search history.

(56) References Cited

U.S. PATENT DOCUMENTS

| | | | | |
|---|---|---|---|---|
| 3,071,973 A | * | 1/1963 | Helfand | 73/492 |
| 3,743,803 A | * | 7/1973 | Roesch et al. | 200/61.45 R |
| 3,798,399 A | * | 3/1974 | Corporandy | 200/61.45 R |
| 4,449,518 A | * | 5/1984 | Konomura et al. | 73/862.53 |
| 4,628,747 A | * | 12/1986 | Weitz et al. | 73/862.44 |
| 5,307,896 A | * | 5/1994 | Taguchi et al. | 200/61.44 |
| 5,458,368 A | * | 10/1995 | Cermak | 280/737 |
| 5,747,761 A | * | 5/1998 | Masuda | 200/61.45 R |
| 5,787,926 A | * | 8/1998 | Mukumoto et al. | 137/514.7 |
| 6,272,901 B1 | * | 8/2001 | Takeuchi et al. | 73/12.01 |
| 6,393,892 B1 | * | 5/2002 | Ohbayashi et al. | 73/12.01 |
| 6,698,272 B1 | * | 3/2004 | Almirante | 73/12.01 |
| 7,194,889 B1 | * | 3/2007 | Jean et al. | 73/12.04 |

FOREIGN PATENT DOCUMENTS

| | | |
|---|---|---|
| JP | 58-49726 | 11/1983 |
| JP | 6-81155 | 11/1994 |
| JP | 7-44978 | 10/1995 |
| JP | 2001-336996 | 12/2001 |
| JP | 2003-8464 | 1/2003 |
| JP | 2003-114180 | 4/2003 |
| JP | 2003-258711 | 9/2003 |
| JP | 2004-228976 | 8/2004 |

OTHER PUBLICATIONS

Written Opinion of the International Searching Authority, mailed Apr. 3, 2008 and issued in corresponding International Patent Application No. PCT/JP2005/017514.

* cited by examiner

Primary Examiner—Lisa M Caputo
Assistant Examiner—Punam Patel
(74) Attorney, Agent, or Firm—Staas & Halsey LLP

(57) ABSTRACT

Displacement occurring by external force between a first member (a case, for example) and a second member (an LCD holder, for example) facing the first member is applied to a detection body (an external force detector), and a loading history of the external force (fracture surfaces) is detected by deformation of the detection body occurring when the force exceeds an allowable limit. Provided are a body section and a force receiving section (a head, arms) projected from the body section. The body section is provided between the first member and the second member facing the first member and is supported by either first or second members. The force receiving section deforms when external force acting in the direction crossing a gap between the first and second members or in the direction along the gap exceeds the allowable limit.

15 Claims, 32 Drawing Sheets

EXTERNAL FORCE DETECTION METHOD, EXTERNAL FORCE DETECTOR AND ELECTRONIC DEVICE

CROSS-REFERENCE TO RELATED APPLICATIONS

This application is a continuation of International Application No. PCT/JP2005/017514, filed on Sep. 22, 2005, now pending, herein incorporated by reference.

BACKGROUND OF THE INVENTION

1. Field of the Invention

The present invention relates generally to detection of external force to an electronic device such as a cellular phone, and particularly to an external force detection method, an external force detector and an electronic device that detect a loading history of external force by using a deformation function for a detection body to have.

2. Description of the Related Art

In a portable terminal device as an example of an electronic device, integration of components thereof is progressing to being high along with high functionalization such as mounting a display module and a camera module, etc. High toughness and strength are requested to protect the device from destruction by external force. If external force exceeding an allowable limit is received, for example in the field, destruction such as damage to functions thereof can not be avoided. Even if failure analysis is executed as to the destroyed device, it is difficult to distinguish whether the destruction results from loading external force or an electric system. For example, there is the case that opening a chassis of the device to identify the cause of destruction thereof has the chassis damaged not to identify the cause thereof.

Concerning external force detection of an electronic device, there are the structures such as; intensity of shocks such as a fall is detected by a pressure-sensitive sensor, and a detection output thereof is displayed on a display section (Japanese Utility Model Application Laid-Open Publication No. H6-81155 (Paragraph 0014, FIG. 2, etc.)); being provided with an acceleration sensor, it is tested whether various function units operate normally by sensing shocks exceeding a certain intensity level, in case a breakage therein is detected, the detected result is recorded with time information and the occurrence of the breakage is informed (Japanese Patent Application Laid-Open Publication No. 2004-228976 (Paragraphs 0050 and 0053, FIGS. 1 and 2, etc.)); casing structure provided with an illegal decomposition detecting lug to detect illegal decomposition of a casing (Japanese Patent Application Laid-Open Publication No. 2003-8464 (Paragraphs 0032 to 0034, FIGS. 4 and 5, etc.)); and being provided with an shock detection part detecting a shock value applied to a device, it is confirmed whether the brake of the shock detection part exists to specify the range of the shock value electrically (Japanese Patent Application Laid-Open Publication No. 2003-114180 (Paragraphs 0030 to 0032, FIGS. 2 to 7, etc.)).

By the way, the structure described in Japanese Utility Model Application Laid-Open Publication No. H6-81155 needs a pressure-sensitive sensor to detect shocks. A control means to process an output from the pressure-sensitive sensor electrically and a display section to display shocks electrically are needed. There are many components to detect shocks, and an electric process is necessary to detect a loading history of shocks, etc. Thus, destruction of an electric system by shocks disables such shock detection and the process following the detection. The structure described in Japanese Patent Application Laid-Open Publication No. 2004-228976 records a signal representing shocks detected by an acceleration sensor in a memory, which needs many components. An electric process is necessary to detect a loading history of shocks, etc. and destruction of an electric system by shocks disables such shock detection and the process following the detection. In the structure described in Japanese Patent Application Laid-Open Publication No. 2003-8464, an illegal decomposition detecting lug disposed on a casing can not detect external force such as fall shocks and a press applied to the casing even if illegal decomposition can be detected. The structure described in Japanese Patent Application Laid-Open Publication No. 2003-114180 includes a plurality of shock detection parts. Because whether the brake of the shock detection part exists is confirmed to detect the range of the shock value electrically, a plurality of components are needed, and a control means, a record means, a display means, etc. to process an electric signal are also needed. The electric process is intervened and is necessary to detect a loading history of shocks, etc. Or, destruction of an electric system by shocks disables such shock detection and the process following the detection.

First, even if any one of structures of Japanese Utility Model Application Laid-Open Publication No. H6-81155, Japanese Patent Application Laid-Open Publication No. 2004-228976, Japanese Patent Application Laid-Open Publication No. 2003-8464 and Japanese Patent Application Laid-Open Publication No. 2003-114180 is used, external force detection needs many components and an electric process. A loading history representing external force being applied can not be recognized easily from an aspect of a chassis without accompanying an electric process.

Second, in device development and user support, it is necessary to identify whether the cause of destruction of a destroyed electronic device is external force or an electric system.

There is no disclosure concerning such problems in any of Japanese Utility Model Application Laid-Open Publication No. H6-81155, Japanese Patent Application Laid-Open Publication No. 2004-228976, Japanese Patent Application Laid-Open Publication No. 2003-8464 and Japanese Patent Application Laid-Open Publication No. 2003-114180, and no disclosure about the structure to solve them and suggestion thereof are presented.

SUMMARY OF THE INVENTION

An object of the present invention relates to external force detection and is to facilitate recognition of a loading history of external force.

Described more particularly, the object thereof is to detect a loading history of external force without needing an electric process and to make the history visible.

In order to achieve the above object, according to a first aspect of the present invention there is provided an external force detection method that detects a loading history of external force exceeding an allowable limit, the method comprising the step of making displacement occurring by external force between a first member and a second member facing the first member operate on a detection body and detecting a loading history of the external force by deformation of the detection body occurring in case that the external force exceeds the allowable limit.

According to such structure, if the displacement occurring between the first and second members by external force such as fall shocks and a press is applied to the detection body, when the external force exceeds an allowable limit, the detection body forms into the deformation such as fracture and form variation. The deformation represents a loading history. The loading history can be easily recognized by the deformation. If an object where the detection body is disposed is, for example, an electronic device, it can be determined easily with such loading history whether failure results from the electrical abnormality or from loading external force by using the loading history for the criterion.

In order to achieve the above object, in the external force detection method, preferably the external force may operate in direction of a gap, width or longitudinal of the first member and second member. If the detection body is deformed by external force, the loading history of the external force can be recognized with the deformation.

In order to achieve the above object, according to the external force detection method, preferably the deformation of the detection body may be fracture or form variation. Using the fracture or the form variation as the deformation of the detection body can be easily recognized and the loading history can be held.

In order to achieve the above object, according to second aspect of the present invention there is provided an external force detector that detects a loading history of external force exceeding an allowable limit, the detector comprising a body section disposed between a first member and a second member facing the first member and supported by one of the first member or the second member; and a first force receiving section projected from the body section and deforming in case that external force operating in the direction crossing a gap between the first member and the second member exceeds the allowable limit.

According to such structure, if external force is applied, in the direction crossing a gap between the first member and the second member, to the first force receiving section by fall shocks and a press, etc., when the external force exceeds an allowable limit, the first force receiving section forms into the deformation such as fracture and form variation. The deformation represents a loading history. The loading history can be easily recognized by the deformation. If an object where the external force detector is disposed is, for example, an electronic device, it can be determined easily with such loading history whether failure results from the electrical abnormality or from loading external force by using the loading history for the criterion.

In order to achieve the above object, according to a third aspect of the present invention there is provided an external force detector that detects a loading history of external force exceeding an allowable limit, the detector comprising a body section disposed between a first member and a second member facing the first member and supported by the second member; and a second force receiving section projected from the body section and deforming in case that external force operating in the direction of a gap between the first member and the second member exceeds the allowable limit.

According to such structure, if external force is applied, in the direction to a gap between the first member and the second member, to the second force receiving section by fall shocks and a press, etc., when the external force exceeds an allowable limit, the second force receiving section forms into the deformation such as fracture and form variation. The deformation represents a loading history. The loading history can be easily recognized by the deformation. If an object where the external force detector is disposed is, for example, an electronic device, it can be determined easily with such loading history whether failure results from the electrical abnormality or from loading external force by using the loading history for the criterion.

In order to achieve the above object, according to the external force detector, preferably a through section may be disposed in the first member and the body section slips out of the through section. If the body section of the external force detector, where deformation such as fracture is generated by receiving external force, jumps out of the through section, the loading history of the external force can be easily recognized by the jumping out.

In order to achieve the above object, preferably the external force detector may comprise a through section formed in the first member and through which the body section passes; and an insertion inhibit section inhibiting insertion of the body section to the through section. According to such structure, in case the body section of the external force detector jumps out of the through section by the deformation, the insertion of the body section to the through section is inhibited by the insertion inhibit section to disable to hide the loading history. Thus, the loading history can be easily recognized.

In order to achieve the above object, according to the external force detector, preferably a fracture surface of the body section or first force receiving section may be colored differently from an outside surface of the first member, the body section or a head of the external force detector. That is, inside coloring of the body section or first force receiving section is differentiated from coloring outside thereof, so that the differentiation facilitates recognition of generating the fracture surface.

In order to achieve the above object, according to the external force detector, preferably a neck whose sectional area is smaller than that of the body section or the first receiving section may be disposed at the first force receiving section side, and the allowable limit of fracture by the external force may be set. Such structure can easily set the allowable limit of fracture toward the external force by the sectional area of the neck.

In order to achieve the above object, according to the external force detector, preferably a hollow section may be formed at the second force receiving section and the allowable limit of fracture by external force may be set. The hollow section is a part of the smaller sectional area. Forming such hollow section can fracture the second force receiving section at the hollow section by external force exceeding the allowable limit the hollow section has. The fracture represents a loading history of the external force.

In order to achieve the above object, according to a fourth aspect of the present invention there is provided an electronic device including an external force detector that detects a loading history of external force exceeding an allowable limit, wherein the external force detector comprises a body section disposed between a first member and a second member facing the first member and supported by the first member; and a first force receiving section projected from the body section and deforming in case that external force operating in the direction crossing a gap between the first member and the second member exceeds the allowable limit.

Such structure realizes external force detection structure in the electronic device including the external force detector. According to such structure, loading external force such as fall shocks and a press to the electronic device can be easily recognized with detection of a loading history thereof without disassembly of the electronic device. It can be easily determined whether failure occurring to the electronic device results from abnormality of an electric system or from loading external force.

In order to achieve the above object, according to a fifth aspect of the present invention there is provided an electronic device including an external force detector that detects a loading history of external force exceeding an allowable limit, the detector comprising a body section disposed between a first member and a second member facing the first member and supported by the second member; and a second force receiving section projected from the body section and deforming in case that external force operating in the direction of a gap between the first member and the second member exceeds the allowable limit. According to such structure, loading external force such as fall shocks and a press to the electronic device can be easily recognized with detection of a loading history thereof without disassembly of the electronic device. It can be easily determined whether failure occurring to the electronic device results from abnormality of an electric system or from loading external force.

In order to achieve the above object, preferably the electronic device may comprise a through section in the first member and the body section may slip out of the through section. The structure having the through section and wherein the body section of the external force detector jumps out by deformation based on external force facilitates recognition of a loading history of the external force operating on the electronic device without disassembly thereof.

In order to achieve the above object, preferably the electronic device may comprise a through section formed in the first member and through which the body section passes; and an insertion inhibit section inhibiting insertion of the body section to the through section. According to such structure, in the electronic device, in case the body section of the external force detector jumps out of the through section by the deformation, the insertion of the body section to the through section is inhibited by the insertion inhibit section to disable to hide the loading history. Thus, the loading history is easily recognized.

In order to achieve the above object, according to the electronic device, preferably a fracture surface of the body section or first force receiving section may be colored differently from an outside surface of the first member, the body section or the first force receiving section. That is, in the electronic device, inside coloring of the body section or first force receiving section is differentiated from coloring outside thereof, so that the differentiation facilitates recognition of generating the fracture surface.

In order to achieve the above object, preferably the electronic device may comprise a neck whose sectional area is smaller than that of the body section or the first receiving section at the first force receiving section side, and the allowable limit of fracture by the external force may be set. According to such structure, in the electronic device, the allowable limit of the electronic device toward the external force can be set by forming a hollow section in the first force receiving section.

In order to achieve the above object, according to the electronic device, preferably a hollow section may be formed at the second force receiving section and the allowable limit of fracture by external force may be set. According to such structure, the allowable limit of the electronic device toward the external force can be set by forming a hollow section in the second force receiving section.

In order to achieve the above object, according to the electronic device, preferably that a fracture surface of the second force receiving section may be colored differently from an outside surface of the first member, the body section or the second force receiving section. That is, in the electronic device, inside coloring of the inside body section or second force receiving section is differentiated from coloring outside thereof, so that the differentiation facilitates recognition of generating the fracture surface.

The features and advantages of the present invention are as follows.

(1) Loading external force exceeding an allowable limit such as fall shocks and a press, or a loading history thereof, can be easily recognized.

(2) Without disassembly of an electronic device such as a portable terminal device, loading external force that exceeds an allowable limit such as fall shocks and a press applied to the electronic device, or a loading history thereof, can be easily recognized.

(3) In failure determination of an electronic device, whether the failure thereof results from loading external force or failure of an electric system can be easily determined on the basis of recognition of a loading history of external force.

Other objects, features, and advantages of the present invention will be understood more clearly by referring to the embodiments and the accompanying drawings.

DETAILED DESCRIPTION OF THE PREFERRED EMBODIMENTS

First Embodiment

Figure 1:
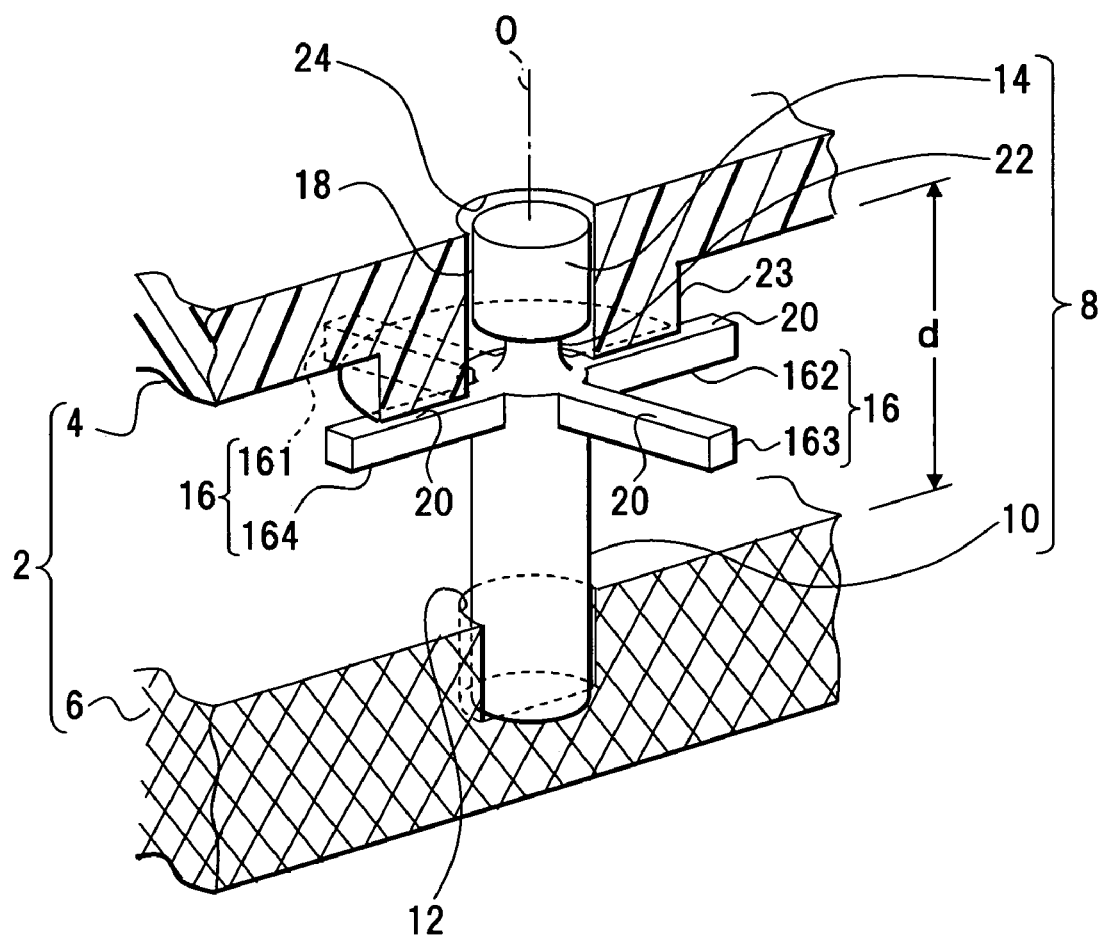
FIG. 1 shows external force detection structure using an external force detector according to a first embodiment.
Figure 2:
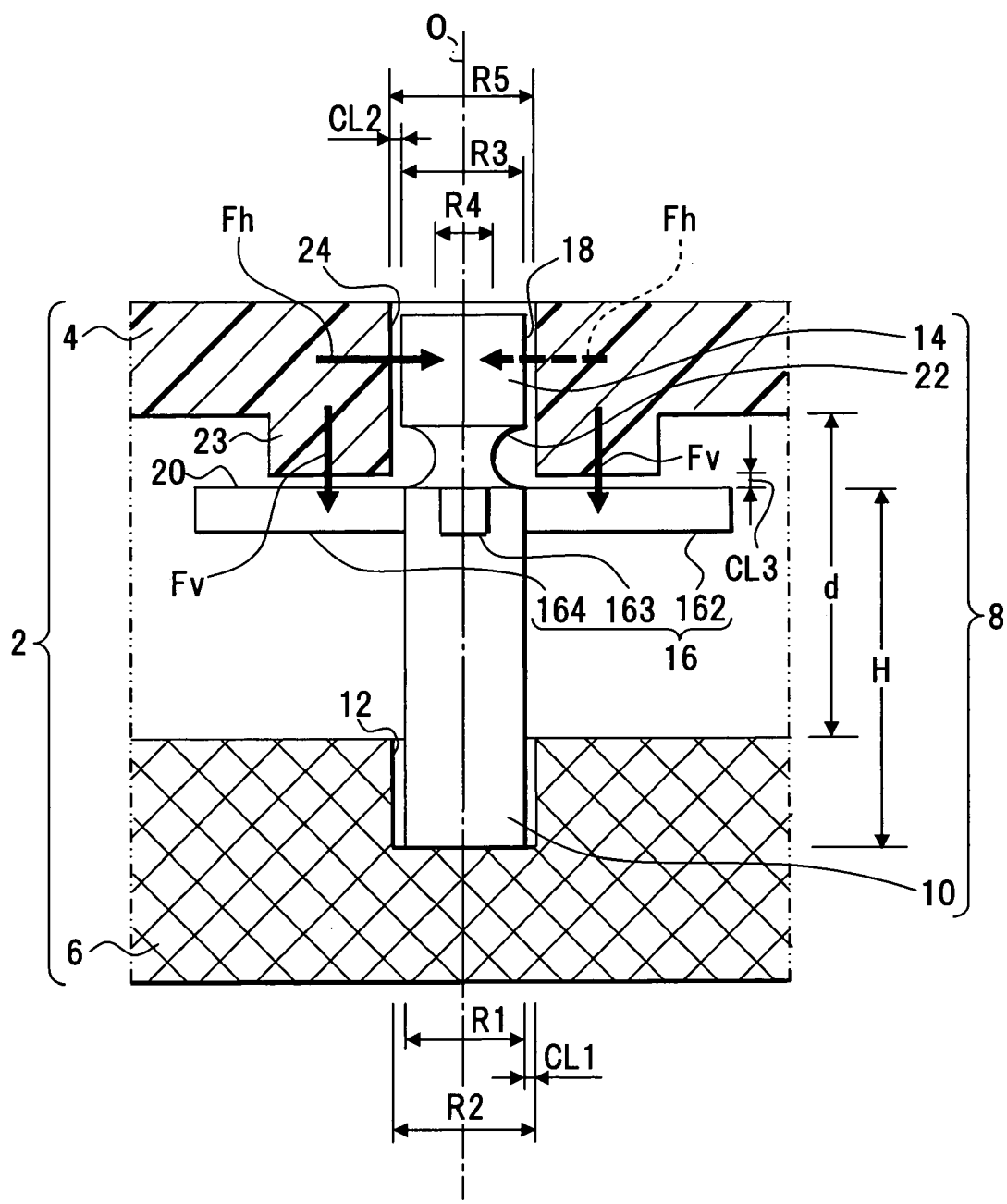
FIG. 2 is a sectional view showing external force detection structure.
Figure 6:
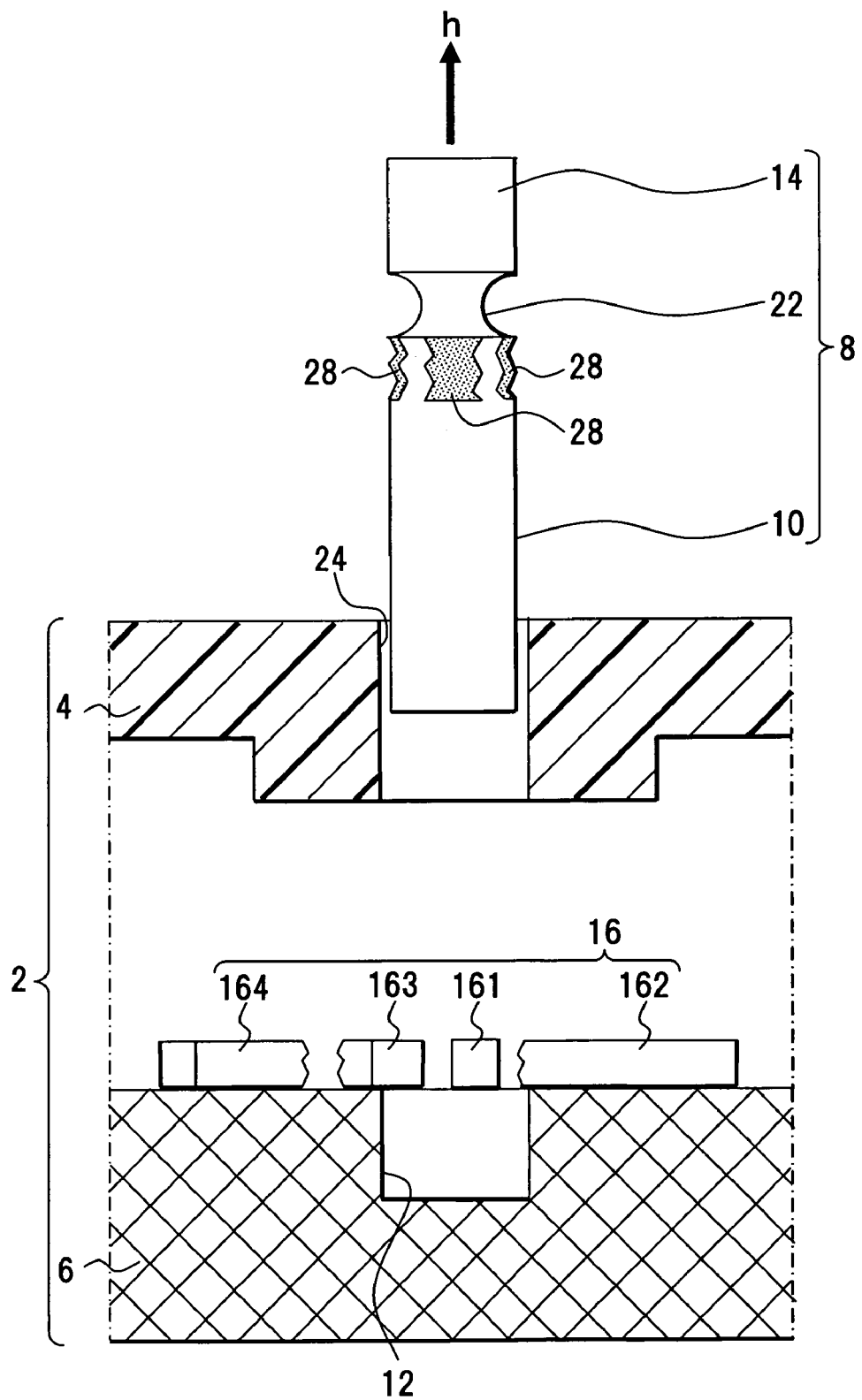
FIG. 6 shows detection operation of external force.
Figure 7:
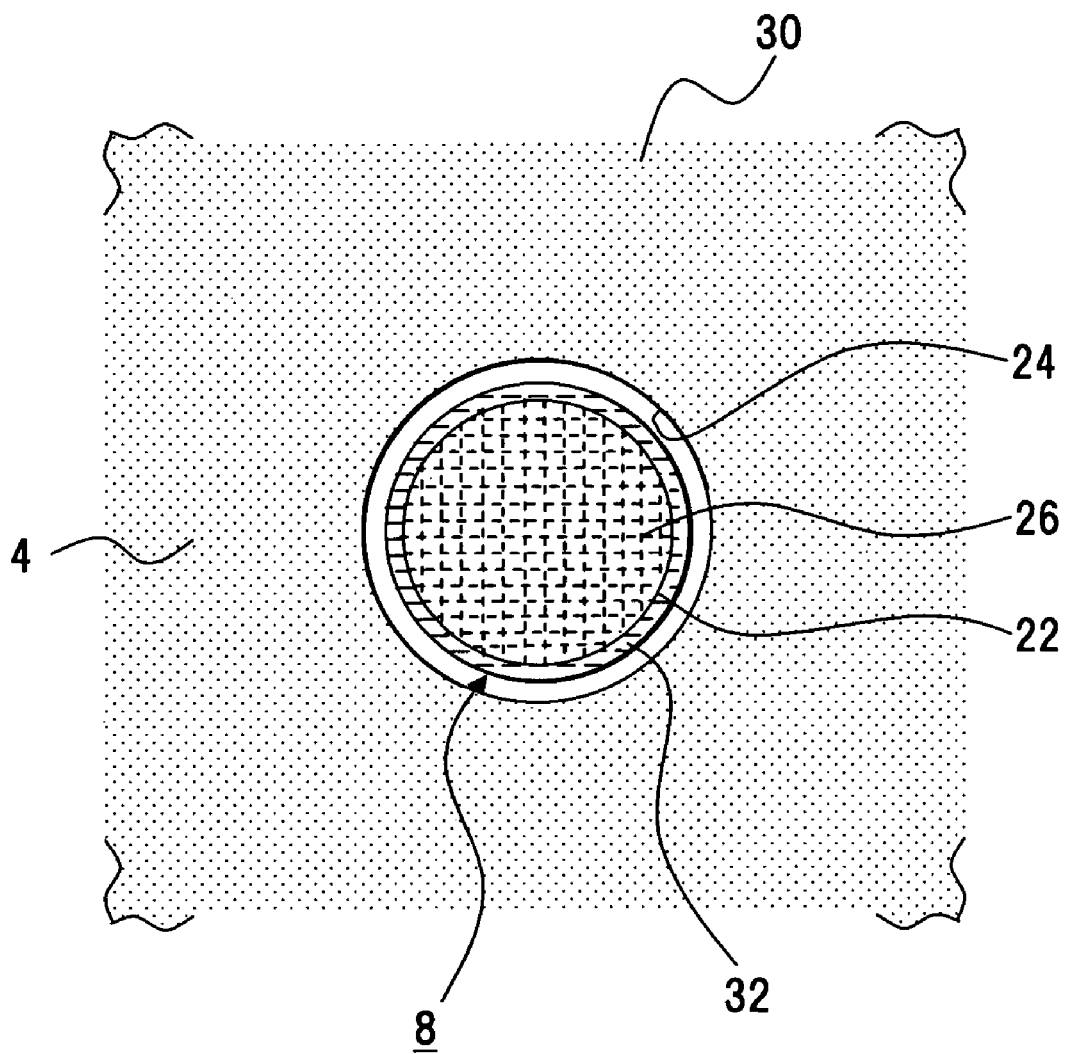
FIG. 7 shows a loading history of external force.
Figure 8:
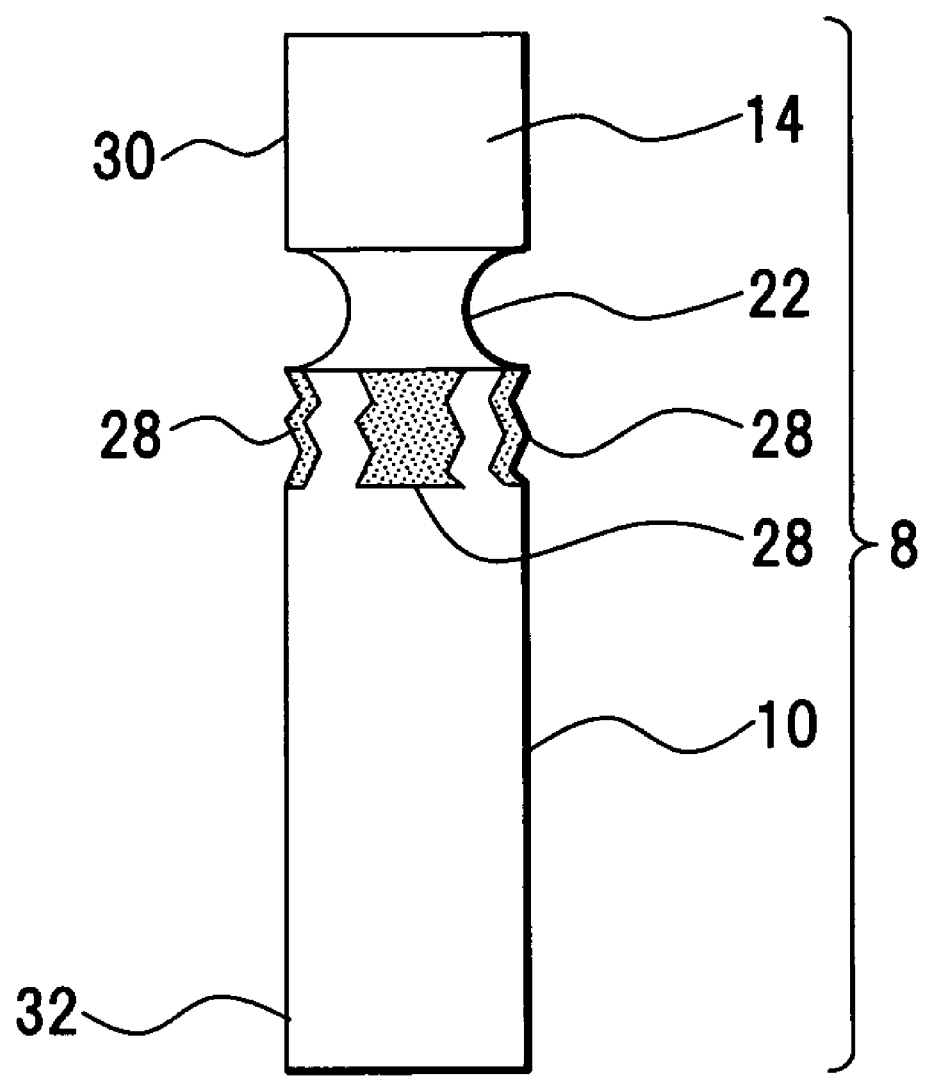
FIG. 8 shows a loading history of external force.

A first embodiment of the present invention will now be described with reference to FIGS. 1 to 8. FIG. 1 shows external force detection structure using an external force detector, FIG. 2 is a vertical sectional view showing external force detection structure, FIGS. 3 to 6 show external force detection operation thereof, and FIGS. 7 and 8 show loading histories.

For example, a portable terminal device 2 as an electronic device, that is a detection object whose loading history of external force is detected, includes a case 4 as a first or a second member and an LCD (Liquid Crystal Display) holder 6 as the second or the first member. The case 4 and the LCD holder 6 are supported to be held in a given gap d by using, e.g., members not shown. The case 4 is an exterior case of the portable terminal device 2. The LCD holder 6 is a built-in component of the portable terminal device 2. The holder 6 is used to hold a liquid crystal device (LCD) in the case 4.

An external force detector 8 is disposed between the case 4 and the LCD holder 6 of the portable terminal device 2 as a detection body to detect loading external force to the portable terminal device 2 and a loading history thereof. A given allowable limit toward external force is set in the external force detector 8. If receiving external force exceeding the allowable limit and displacement by the external force, the detector 8 detects loading external force to be deformed. The deformation thereof effects displaying a loading history. Here, the deformation of the external force detector 8 means partial fracture and other form variation of the external force detector 8. Displaying a loading history means a state that fracture and form variation, etc. of the external force detector 8 appear. In this embodiment, partial fracture of the external force detector 8 effects detection of external force. A state of the fracture thereof shows a loading history of external force.

To realize the functions such as external force detection and displaying of a loading history, the external force detector 8 includes structures to fix itself at the position where the detector 8 detects external force, to receive external force and to receive external force to fracture, which is displayed by separation from the portable terminal device 2 or a fracture surface. The structure receiving external force to fracture includes the external force detector 8 partly or totally formed out of materials that are able to fracture. As an example thereof, the external force detector 8 can be made of a synthetic resin compact.

A body section 10 as a support member, which supports the external force detector 8 at the detection part of external force, is included in the detector 8. The body section 10 is, for example, a cylinder. As shown in FIG. 2, a diameter R1 and a height H of the body section 10 are set according to a detection object of external force, etc. In this case, a support depression part 12 where the body section 10 is supported is formed in the LCD holder 6. A bottom heel of the main section 10 is inserted into the support depression part 12. The external force detector 8 is set standing detachably to the LCD holder 6 (FIG. 1). In this case, an inside diameter R2 of the support depression part 12 is longer than the outside diameter R1 of the body section 10. Since a clearance CL1 (=R2−R1) composing play is set between R2 and R1, the body section 10 can be separated from the support depression part 12.

As the structure receiving external force, a head 14 is formed in the external force detector 8 as a first force receiving section in the same direction of an axis O of the body section 10. A plurality of arms 161, 162, 163 and 164 projected in the crossing direction of the axis O of the body section 10 are also formed in the detector 8 as a second force receiving section 16. In this case, an outside diameter R3 of the head 14 is set in the same length of the outside diameter R1 of the body section 10 (R1=R3). Each arm 161, 162, 163 and 164 is formed radially at a predetermined angle, for example, a 90 degree angle to each other. A force receiving surface 18 is set on the surface around the head 14. The force receiving surface 18 receives external force Fh shown by an arrow of a broken line or a solid line in the crossing direction of the axis O (not limited in the horizontal direction), that is, in the direction crossing the gap. A force receiving surface 20 is set on the top surface of each arm 161 to 164. The force receiving surfaces 20 receive external force Fv in the same direction of the axis O (not limited in the vertical direction), that is, in the direction of the gap d. In other words, the head 14 and the arms 161 to 164 that are two varieties of force receiving sections can receive external force operating on the portable terminal device 2 in all the direction.

As the structure making a loading history indicate by receiving external force to fracture, a neck 22 is formed in the external force detector 8 as a first force receiving detection section between the body section 10 and the head 14. A second force receiving detection section is also constituted in the detector 8 as the structure that the roots between the body section 10 and the arms 161 to 164 are fractured by external force. In this case, toward the outside diameters R1 of the body section 10 and R3 of the head 14, if the minimum diameter of the neck 22 is defined as R4, R4 is formed shorter than the outside diameters R1 of the body section 10 and R3 of the head 14 (R1, R3>R4), and an allowable limit that enables fracture toward external force is set. That is, in this case, the neck 22 is composed of a depression formed on the surface around the cylindrical body section 10 and the head 14 to be set to be able to fracture by external force exceeding the allowable limit.

A through hole 24 is formed at the position according to the support depression part 12 of the LCD holder 6 in the case 4. The head 14 of the external force detector 8 is fit into the through hole 24. That is, the through hole 24 forms a through section that allows the external force detector 8 to jump out in fracturing described later. In this case, the tip surface of the head 14 is slightly backed in the direction inside the through hole 24 from the surface of the case 4. Thus, direct stress operation on the head 14 can be avoided. A ringed projection part 23 projecting to the LCD holder 6 side is formed at the part around the through hole 24. An inside diameter R5 of the through hole 24 is set longer than the outside diameter R3 of the head 14. The projection part 23 is faced to the force receiving surfaces 20 of the arms 161 to 164. That is, between the inside diameter R5 of the through hole 24 and the outside diameter R3 of the head 14, a clearance CL2 setting a slight play gap is set, and between the projection part 23 and the force receiving surfaces 20 of the arms 161 to 164, a clearance CL3 setting a slight play gap is set. As such clearances CL2 and CL3 are set, influence of external force received by the portable terminal device 2 in normal use such as grasp upon the external force detector 8 can be avoided. Thus, the allowable limit of the neck 22 fracturing toward external force is determined by the diameter R4 of the neck 22, the size of the clearance CL2 and the strength of formation material. The allowable limit of the arms 161 to 164 fracturing toward external force is determined by the diameter of the arms 161 to 164, the size of the clearance CL3 and the strength of formation material.

Figure 3:
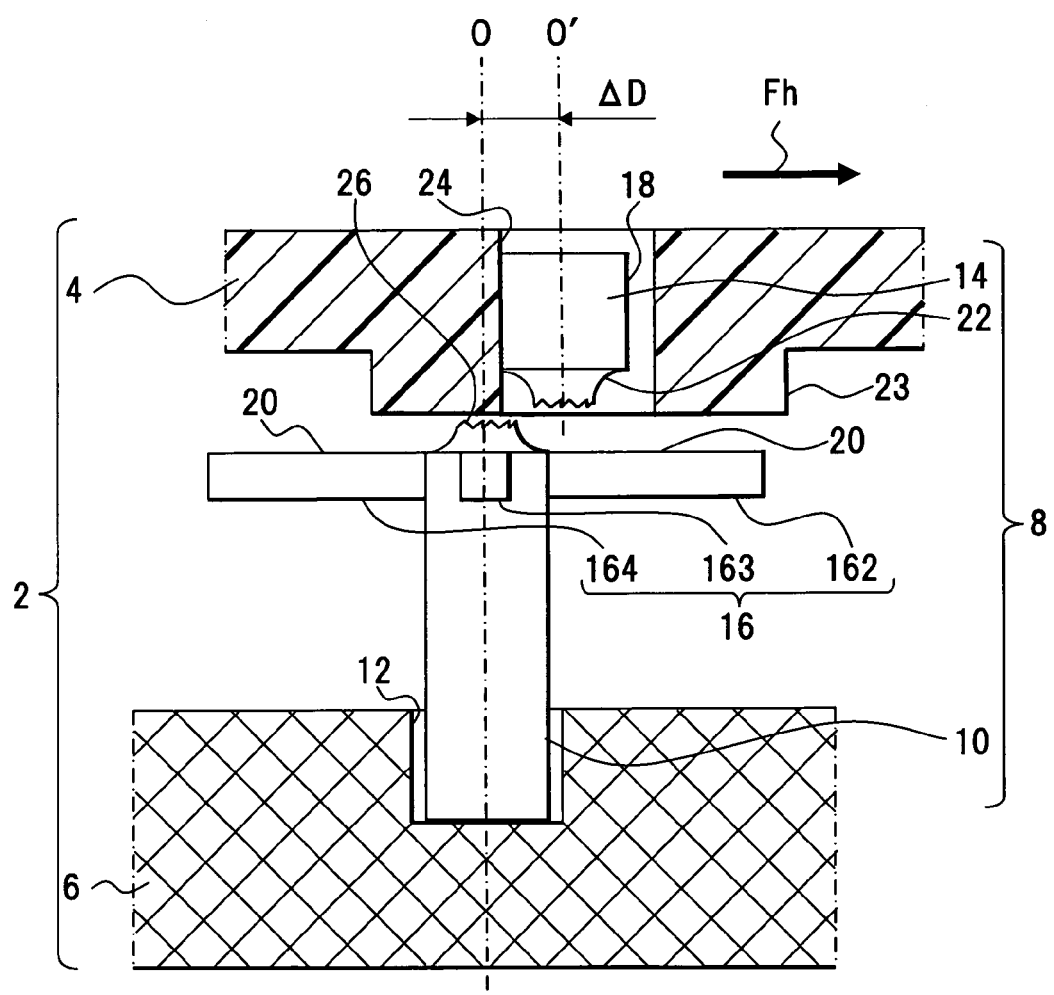
FIG. 3 shows detection operation of external force.
Figure 4:
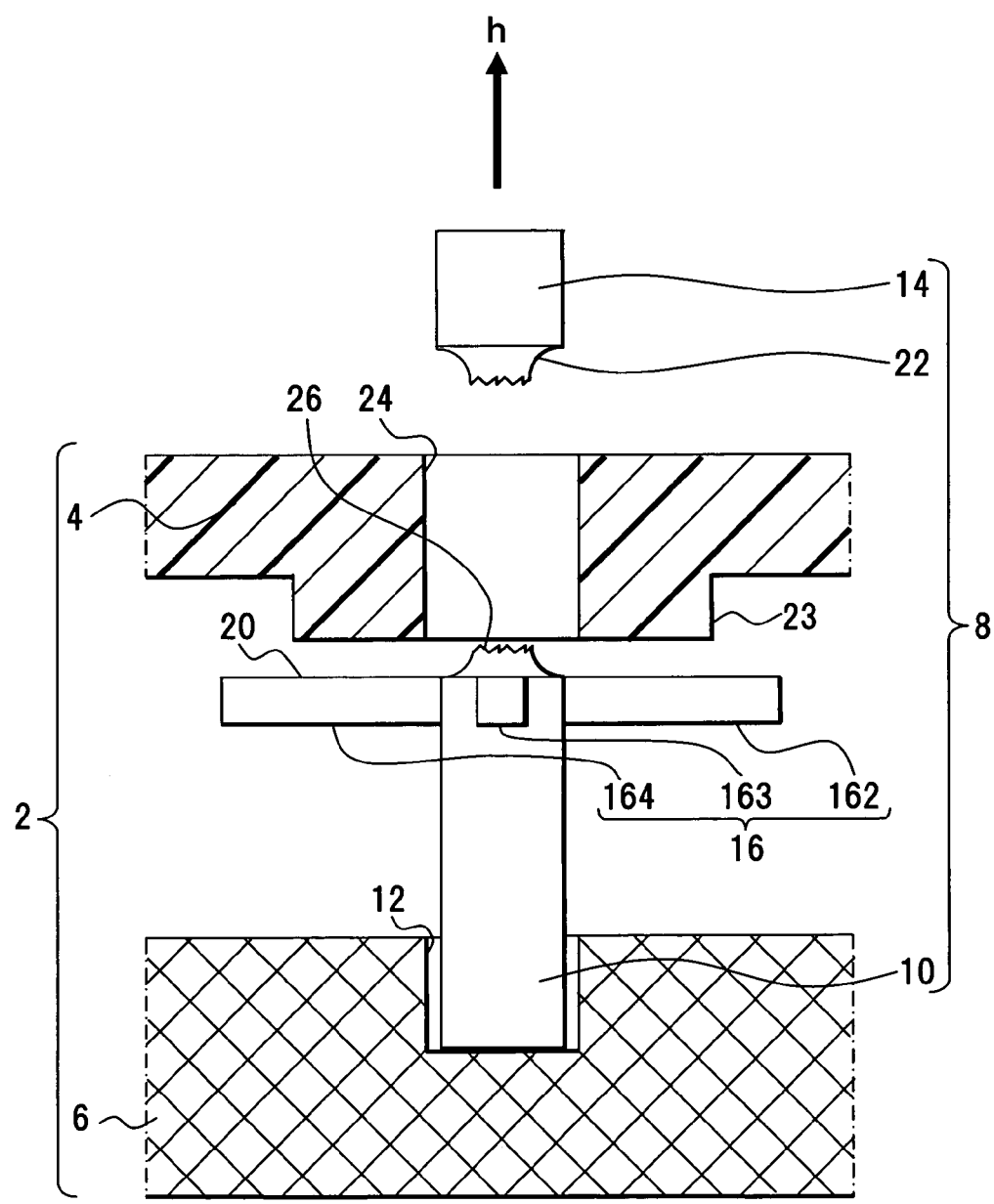
FIG. 4 shows detection operation of external force.

A detection method for loading external force and a loading history will be described. When strong shocks such as a fall is applied to the portable terminal device 2, for example as shown in FIG. 3, external force Fh operates on the case 4 and the LCD holder 6 in the direction crossing the gap between them (the longitudinal or width direction of the portable terminal device 2). The external force Fh operates on the neck 22 via the head 14 fit in the through hole 24 of the case 4. Also, Fh moves the case 4 in one direction and moves the LCD holder 6 in the opposite direction. As a result, stress concentrates on the neck 22 and shear force operates. If the external force Fh exceeds the allowable limit set in the neck 22 of the external force detector 8, the neck 22 is fractured by receiving shear force. Since the diameter of the head 14 is shorter than that of the through hole 24, the head 14 separating from the body section 10, as shown in FIG. 4, jumps out from the through hole 24 of the case 4 in the direction shown by an arrow h. Thus, separation of the head 14 and fracture of the neck 22 show loading of the external force Fh exceeding the allowable limit toward the portable terminal device 2 and a loading history thereof. Especially, a fracture surface 26 at the neck 22 of the body section 10 side remaining in the portable terminal device 2 shows a trace of the external force, that is, the loading history of the external force, as well. In this case, if the head 14 separates, a depression is generated in order that there is not the head 14 in the through hole 24 of the case 4, and the fracture surface 26 of the neck 22 is exposed from the through hole 24 to be visible.

Figure 5:
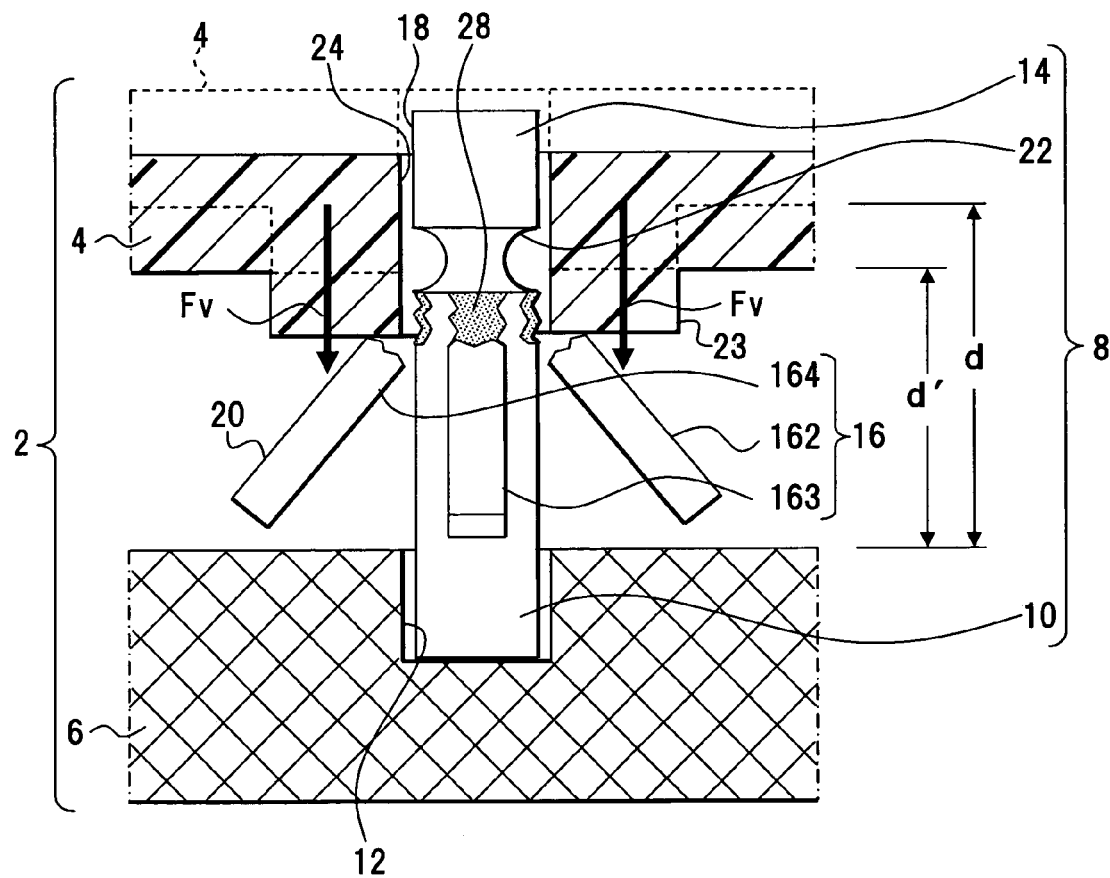
FIG. 5 shows detection operation of external force.

For example as shown in FIG. 5, when external force Fv operates on, e. g., the case 4 in the direction narrowing the gap between the case 4 and the LCD holder 6 (the thick direction of the portable terminal device 2) by shocks applied to the portable terminal device 2 and the external force Fv exceeds allowable limits of the arms 161 to 164 of the external force detector 8 or the roots thereof where stress concentrates, the arms 161 to 164 receive shear force by shocks of the projection part 23 of the case 4 to be fractured. In this case, the gap d between the case 4 and the LCD holder 6 is narrowed to a gap d' (<d) by the operation of the external force Fv. As a result, the external force detector 8 where the arms 161 to 164 fracture loses a retaining function toward the through hole 24 of the case 4. As shown in FIG. 6, the external force detector 8 jumps out from the through hole 24 of the case 4 in the direction shown by the arrow h to separate. That is, the separation of the body section 10 of the external force detector 8 from the portable terminal device 2 and the fracture of the arms 161 to 164 show loading of the external force Fv exceeding the allowable limits to the portable terminal device 2 and a loading history thereof. Or, fracture surfaces 28 thereof show a trace of the external force, that is, the loading history of the external force. Thus, only such body section 10 being confirmed, a loading history of external force applied to the portable terminal device 2 can be recognized without disassembly of the portable terminal device 2. Moreover, according to the external force detector 8 of the embodiment, because loading histories of external force Fv in the direction of the gap between the case 4 and the LCD holder 6 and external force Fh in the direction crossing the gap direction can be detected, external force from a solid angle of 360 degrees, that is, from the direction of XYZ axes can be detected and a loading history thereof can be recognized.

In the embodiment, for example as shown in FIG. 7, if the fracture surface 26 of the neck 22 is colored different from a surface 30 of the case 4 of the portable terminal device 2 or a surface 32 of the external force detector 8, the fracture surface 26 can be easily recognized.

Similarly, as shown in FIG. 8, if the fracture surfaces 28 of the arms 161 to 164 are colored different from the surface 30 of the case 4 of the portable terminal device 2 or the surface 32 of the external force detector 8, the fracture surfaces 28 of the arms 161 to 164 in the external force detector 8 separating from the portable terminal device 2 can be easily recognized.

Second Embodiment

Figure 9:
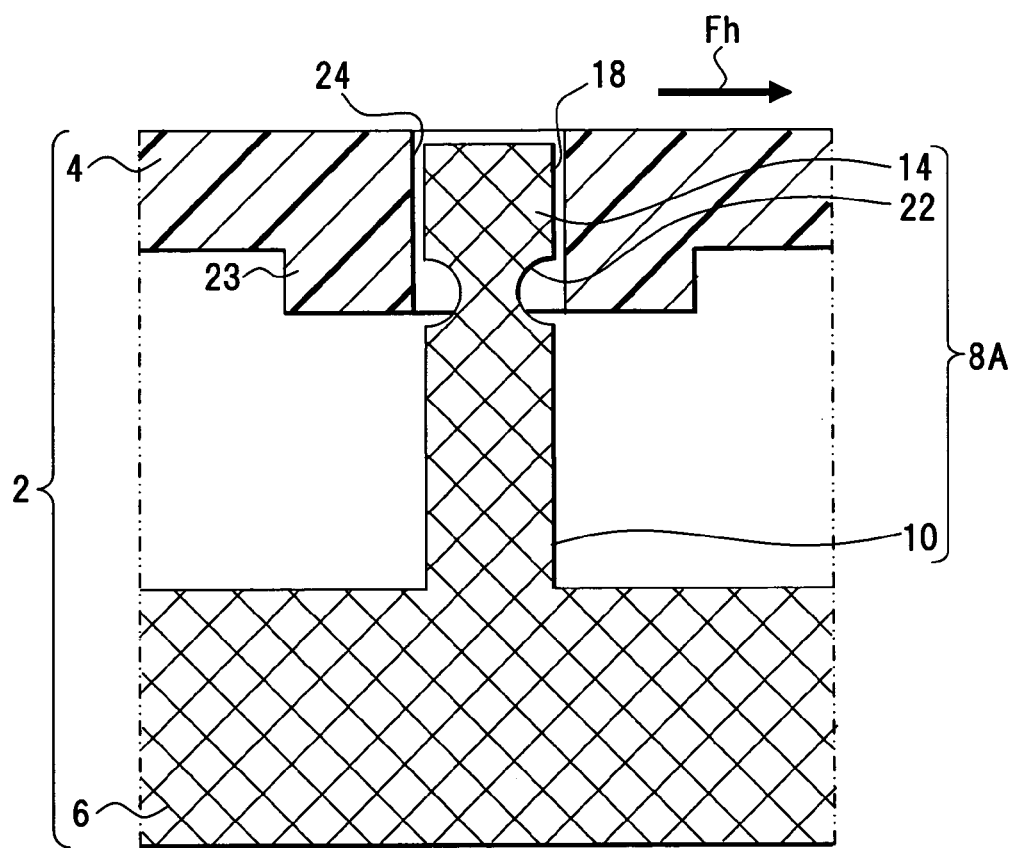
FIG. 9 shows external force detection structure using an external force detector according to a second embodiment.

A second embodiment of the present invention will be described with reference to FIG. 9. FIG. 9 is a sectional view showing external force detection structure using another external force detector. In FIG. 9, the same components as described in FIG. 1 are denoted by the same reference numerals.

The above described external force detector 8 (FIGS. 1 and 2) includes the arms 161 to 164 in the body section 10. In an external force detector 8A according to the embodiment, diameters of a body section 10 and a head 14 are set in the same lengths and a neck 22 having a shorter diameter than that of the head 14 is included at the head 14 side. In the embodiment, the described arms 161 to 164 are not formed. In external force detection structure of a portable terminal device 2 including the external force detector 8A, the body section 10 of the external force detector 8A is formed to be unified at the top surface of an LCD holder 6. The head 14 is fit to a through hole 24 formed in the case 4. The bottom surface of a projection part 23 projecting from the part around the through hole 24 corresponds to the part around the neck 22. The top surface of the LCD holder 6 and the body section 10 may be unified by fixing separate members with adhesive, etc.

According to such structure, the operation as described above can be obtained (FIGS. 3 and 4). That is, when strong shocks such as a fall is applied to the portable terminal device 2 and external force Fh operates on the case 4 in the direction dislocating the case 4 and the LCD holder 6 (the longitudinal or width direction of the portable terminal device 2), the external force Fh operates on the neck 22 via the head 14 fit in the through hole 24 of the case 4. Also, Fh moves the case 4 in one direction and moves the LCD holder 6 in the opposite direction. As a result, stress concentrates on the neck 22 and shear force operates. If the external force Fh exceeds the allowable limit set in the neck 22 of the external force detector 8A, the neck 22 is fractured by receiving shear force. Since the diameter of the head 14 is shorter than that of the through hole 24, the head 14 separating from the body section 10 jumps out from the through hole 24 of the case 4. Thus, separation of the head 14 and fracture of the neck 22 show loading of the external force Fh exceeding the allowable limit toward the portable terminal device 2 and a loading history thereof. Especially, a fracture surface 26 at the neck 22 of the body section 10 side remaining in the portable terminal device 2 shows a trace of the external force, that is, the loading history of the external force, as well.

Third Embodiment

Figure 10:
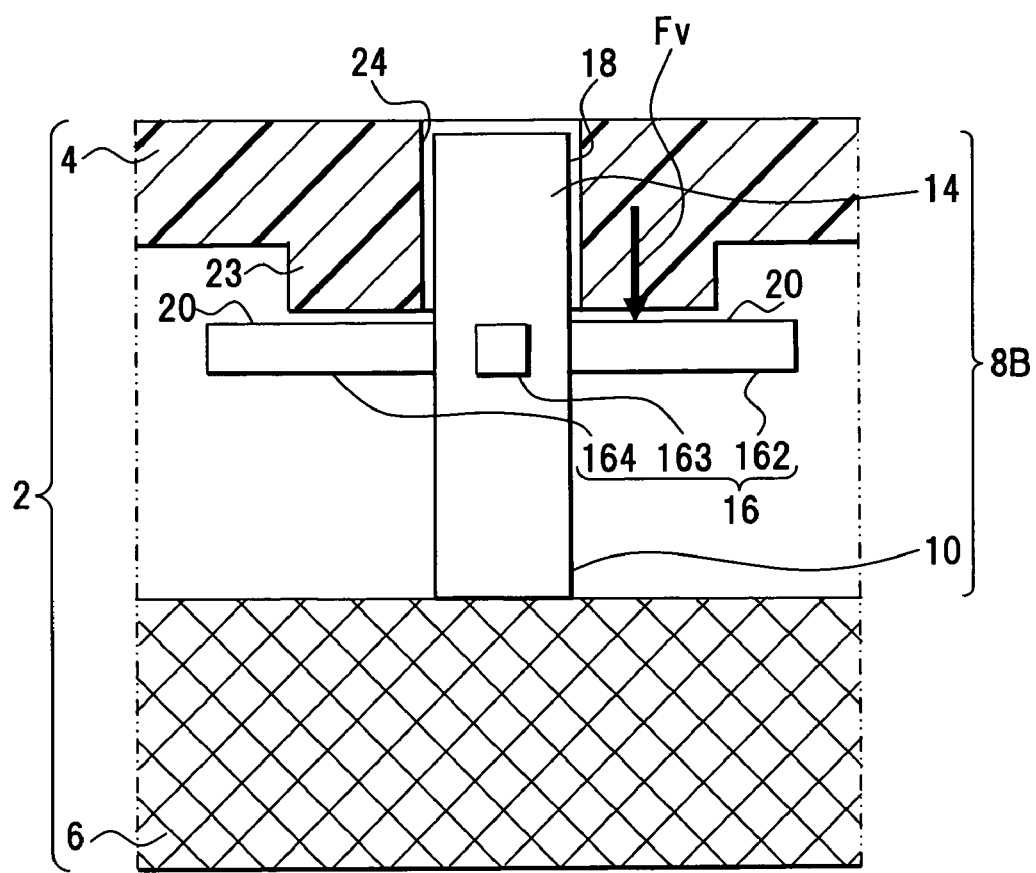
FIG. 10 shows external force detection structure using an external force detector according to a third embodiment.

A third embodiment of the present invention will be described with reference to FIG. 10. FIG. 10 is a sectional view showing external force detection structure using another external force detector. In FIG. 10, the same components as described in FIG. 1 are denoted by the same reference numerals.

The above described external force detector 8 (FIGS. 1 and 2) includes the neck 22 that has the minor diameter between the body section 10 and the head 14. In an external force detector 8B according to the embodiment, diameters of a body section 10 and a head 14 are set in the same lengths and only the above described arms 161 to 164 are included. In other words, the external force detector 8B consists of the body section 10 and the arms 161 to 164. In external force detection structure of a portable terminal device 2 including the external force detector 8B, the body section 10 of the external force detector 8B is mounted on the top surface of an LCD holder 6. The head 14 is fit to a through hole 24 formed in a case 4. A projection part 23 projecting from the part around the through hole 24 is faced to force receiving surfaces 20 of the arms 161 to 164. In this case, the above described support depression part 12 (FIGS. 1 and 2) is not formed, so fitting the position of the through hole 24 into the support depression part 12 is not necessary.

According to such structure, the operation as described above can be obtained (FIGS. 5 and 6). When external force Fv operates on, e. g., the case 4 in the direction narrowing the gap between the case 4 and the LCD holder 6 (the thick direction of the portable terminal device 2), and if the external force Fv exceeds allowable limits of the arms 161 to 164 of the external force detector 8B or the roots thereof where stress concentrates, the arms 161 to 164 receive shear force by shocks of the projection part 23 of the case 4 to be fractured. The external force detector 8B where the arms 161 to 164 fracture loses a retaining function toward the through hole 24 of the case 4. As a result, the external force detector 8B jumps out from the through hole 24 of the case 4 to separate. That is, the separation of the body section 10 of the external force detector 8B from the portable terminal device 2 and the fracture of the arms 161 to 164 show loading of the external force Fv exceeding the allowable limits to the portable terminal device 2 and a loading history thereof. Or, fracture surfaces 28 thereof show a trace of the external force, that is, the loading history of the external force.

Fourth Embodiment

Figure 11:
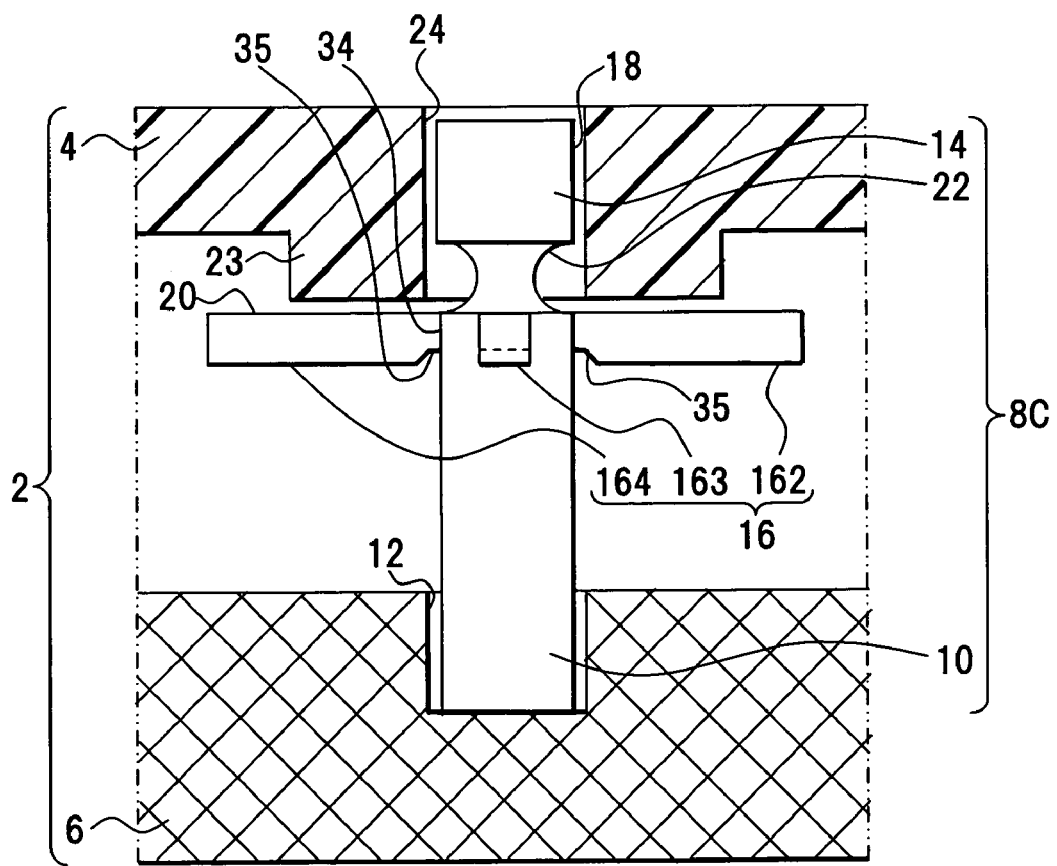
FIG. 11 shows external force detection structure using an external force detector according to a forth embodiment.

A fourth embodiment of the present invention will be described with reference to FIG. 11. FIG. 11 is a sectional view showing external force detection structure using another external force detector. In FIG. 11, the same components as described in FIG. 1 are denoted by the same reference numerals.

In an external force detector 8C, hollow sections 34 are formed at the roots of arms 161 to 164, and allowable limits that limit fracture toward external force. That is, when external force Fv in the direction narrowing a gap between a case 4 and an LCD holder 6 is received, fracture is occurred at the hollow sections 34 at the roots of the arms 161 to 164 to enable the body section 10 to certainly jump out from a through hole 24 of the case 4. The fracture surfaces 28 (FIG. 8) can be formed at the parts of the hollow sections 34. In this case, the hollow section 34 is formed by setting a depression 35 at a bottom surface of each arm 161 to 164. Not only by such depression 35, the hollow section 34 may be formed but also by narrowing a sectional area of the root of each arm 161 to 164.

Fifth Embodiment

Figure 12:
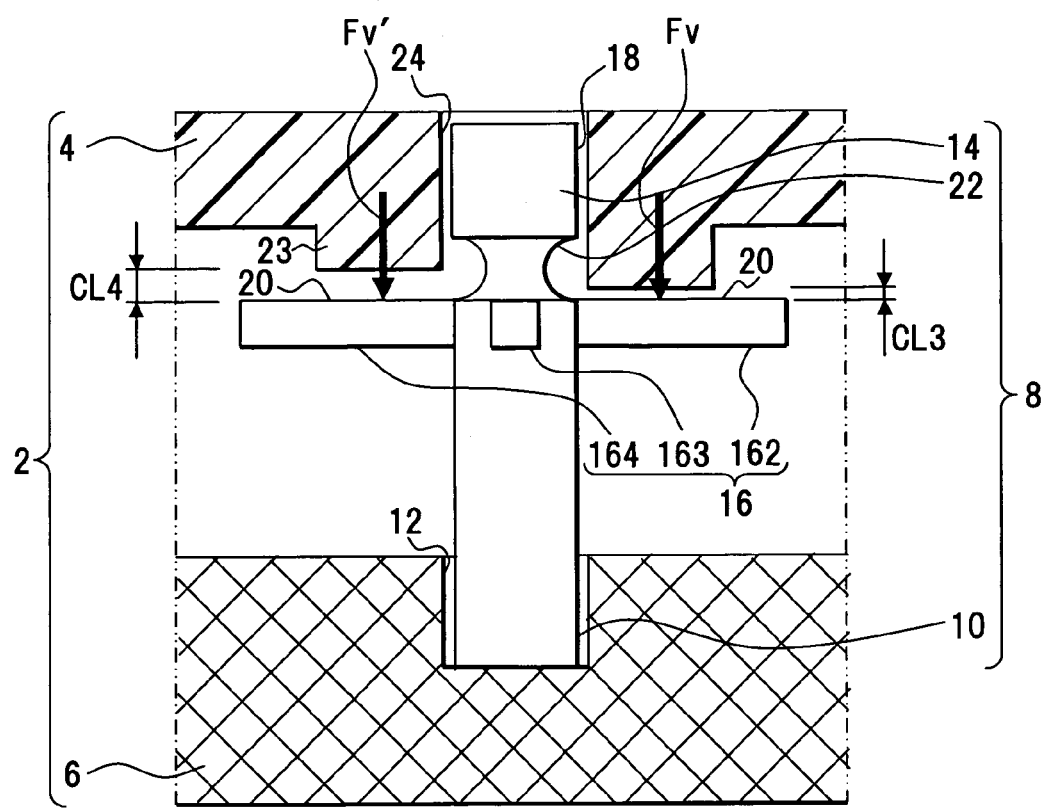
FIG. 12 shows external force detection structure using an external force detector according to a fifth embodiment.

A fifth embodiment of the present invention will be described with reference to FIG. 12. FIG. 12 is a sectional view showing another external force detection structure using an external force detector. In FIG. 12, the same components as described in FIGS. 1 and 2 are denoted by the same reference numerals.

The external force detection structure shown in FIG. 2 sets the clearance CL3 between the arms 161 to 164 and the projection part 23 of the case 4 regularly. In external force detection structure according to this embodiment, while a clearance CL3 is set between force receiving surfaces 20 of an arm 162 of an external force detector 8 and a projection part 23, a clearance CL4 (>CL3) where a play gap larger than that of the clearance CL3 is set is set at an arm 164.

Like the above, toward the force receiving surface 20 of each arm 161 to 164 in the same height from an LCD holder 6, if the clearances CL3 and CL4 that are different size from each other are set by differentiating projecting length of the projection part 23, an allowable limit that limits fracture toward external force can be differentiated by each of the arm 161 to 164 corresponding to each of the clearance CL3 and CL4. For example, to certain external force Fv, after the arm 162 fractures, the arm 164 can be fractured by stronger external force Fv'.

Sixth Embodiment

Figure 13:
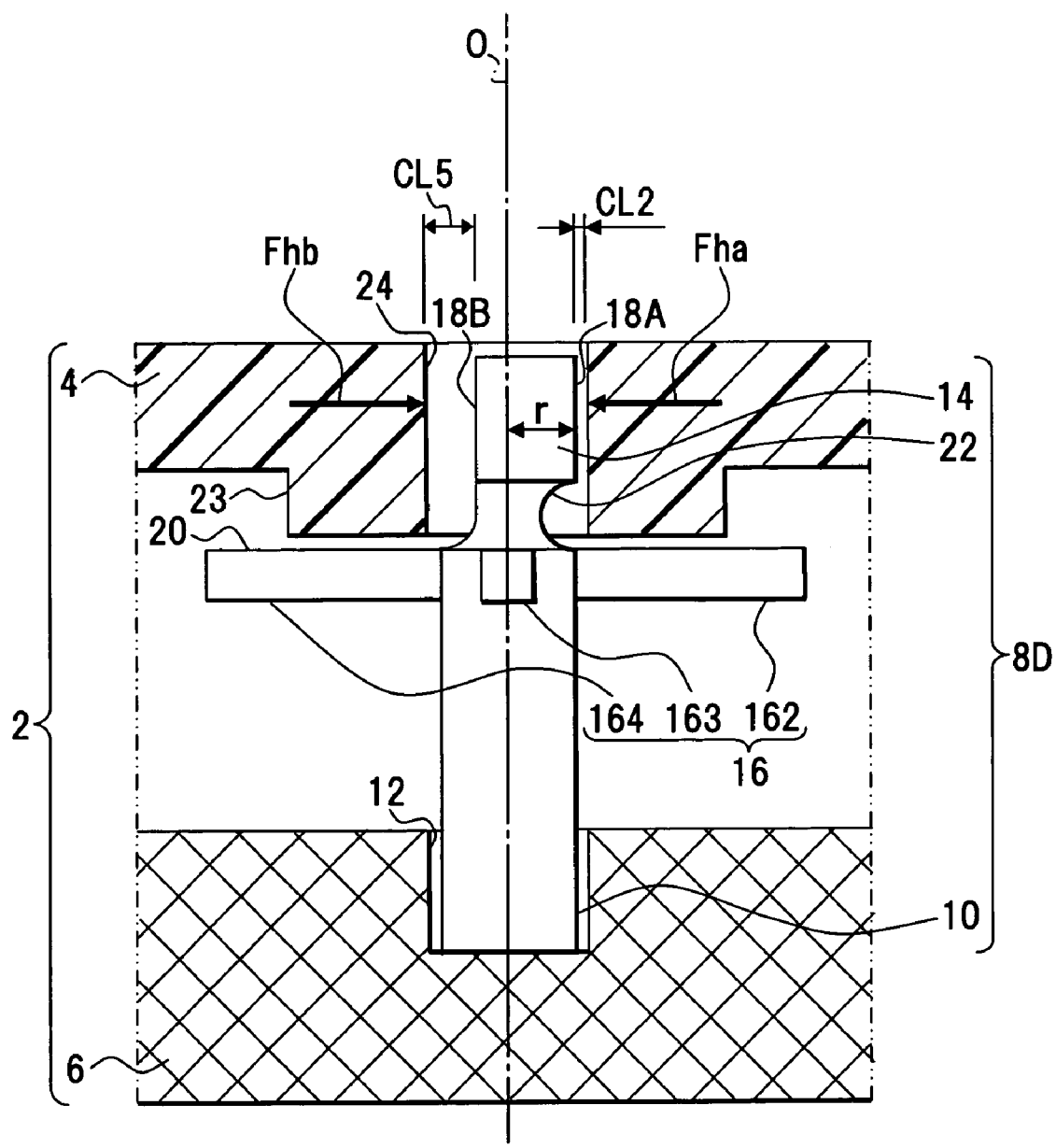
FIG. 13 shows external force detection structure using an external force detector according to a sixth embodiment.

A sixth embodiment of the present invention will be described with reference to FIGS. 13 and 14. FIG. 13 is a sectional view showing external force detection structure using another external force detector and FIG. 14 shows an external force detector in which a head 14 is viewed from the top side.

The external force detection structure shown in FIG. 2 sets the clearance CL2 between the force receiving surface 18 of the head 14 and an inside wall of the through hole 24 of the case 4 regularly. In external force detection structure according to the embodiment, a force receiving surface 18A having distance of a radius r from the middle of a head 14 and a force receiving surface 18B backed from the force receiving surface 18A are included in the head 14. Against the clearance CL2 between the force receiving surface 18A and the inside wall of a through hole 24 of the case 4, a clearance CL5 (>CL2) between the force receiving surface 18B and the inside wall of the through hole 24 of the case 4 is set.

Figure 14:
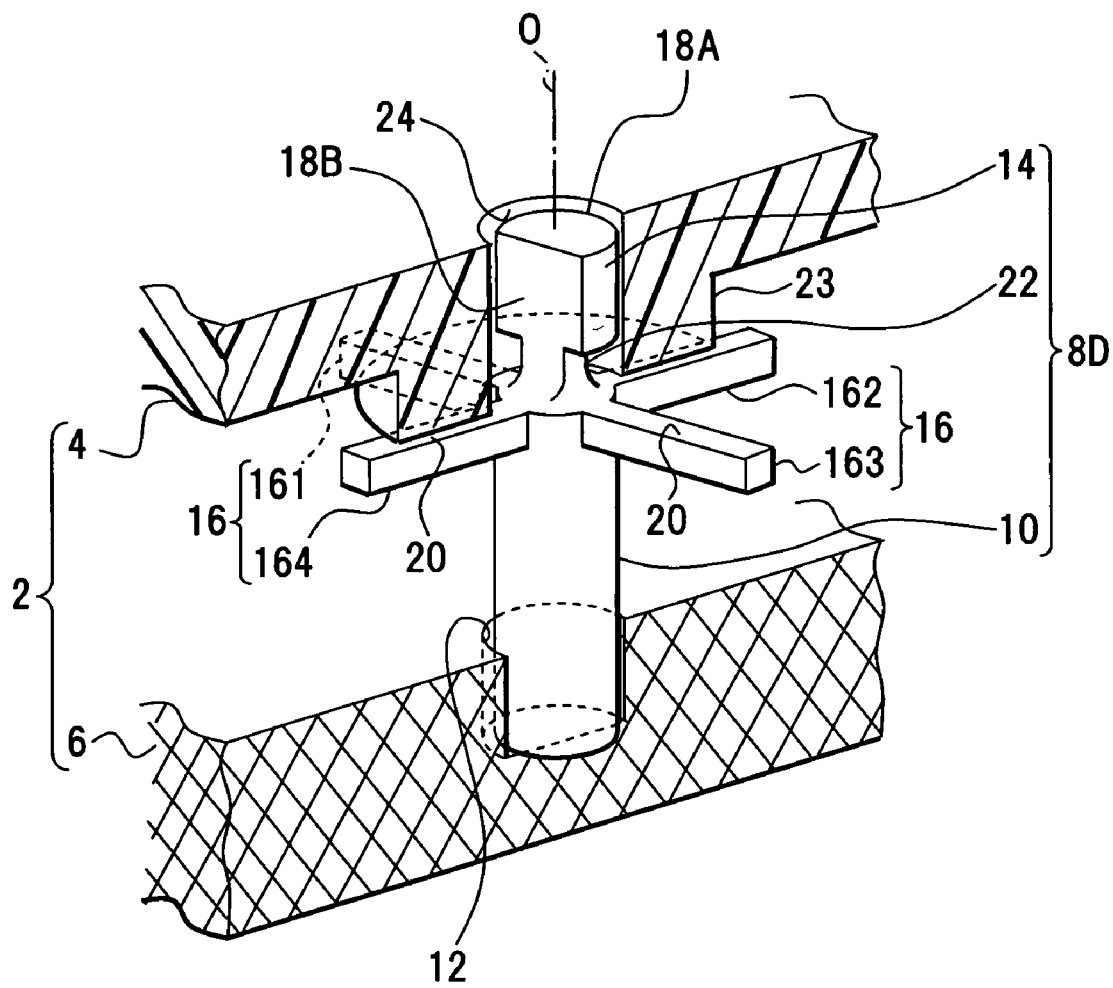
FIG. 14 shows external force detection structure using an external force detector according to a sixth embodiment.

In an external force detector 8D constituting such external force detection structure, as shown in FIG. 14, the force receiving surface 18B constituted of a vertical face with notching a part of the cylindrical head 14 may be formed. As other structure, the head 14 may be formed into an eccentric cylinder or the force receiving surface 18B may be a curved surface.

According to such structure, because the clearance CL2 is set between the force receiving surface 18A of the head 14 and the inside wall of the through hole 24 of the case 4 and the clearance CL5 is set between the force receiving surface 18B of the head 14 and the inside wall of the through hole 24 of the case 4, an allowable limit that limits fracture of the neck 22 by external force becomes different by each of the clearances CL2 and CL5. In this case, if external force that operates on the force receiving surfaces 18A and 18B to fracture the neck 22 is defined as Fha and Fhb, Fha<Fhb. That is, the allowable limit of external force operating on the force receiving surface 18B becomes higher than that of the force receiving surface 18A. Such differentiation of the allowable limits of fracture toward external force can realize external force detection structure according to a detection part of external force and an electronic device.

Seventh Embodiment

Figure 15:
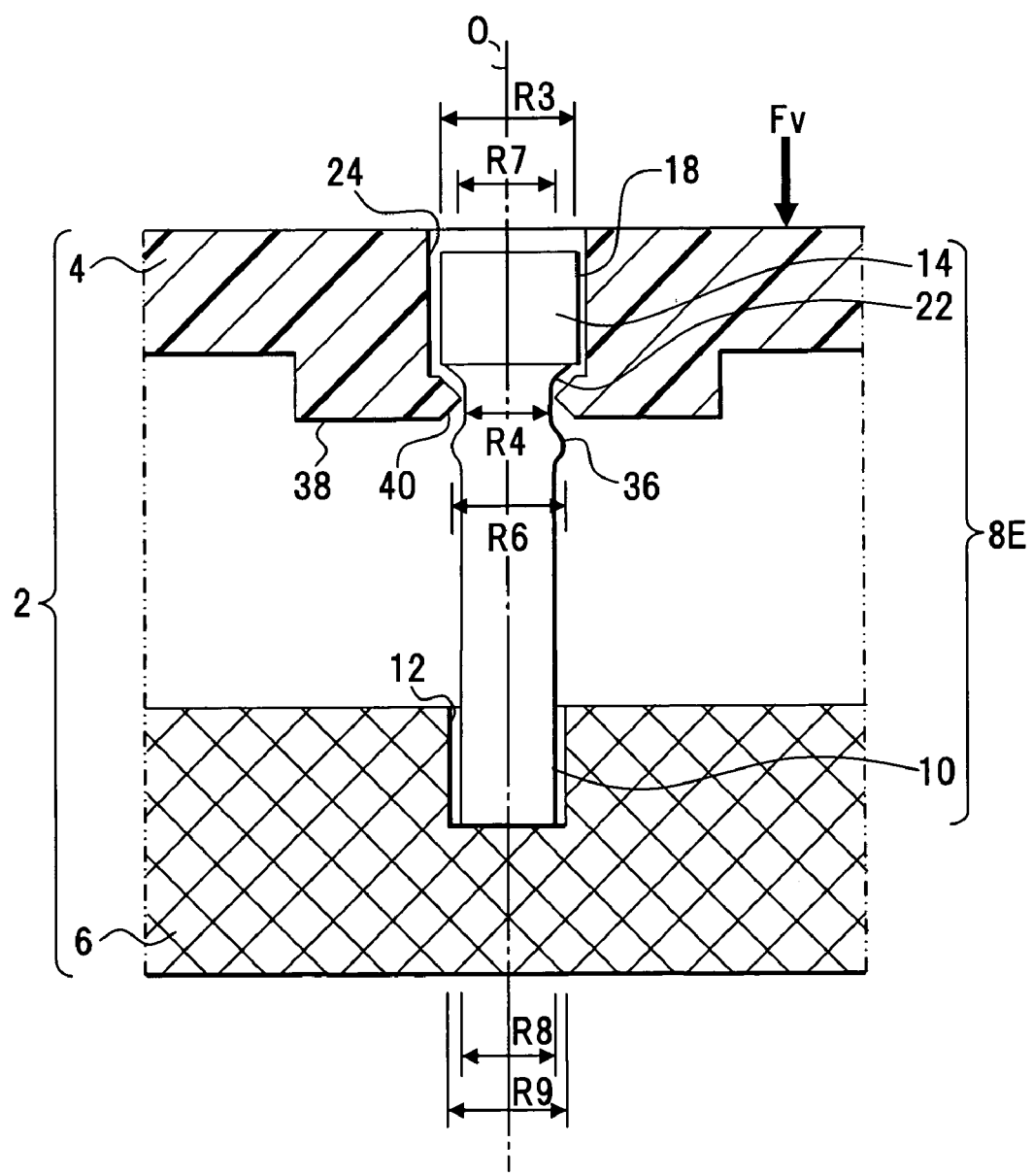
FIG. 15 shows external force detection structure using an external force detector according to a seventh embodiment.
Figure 16A:
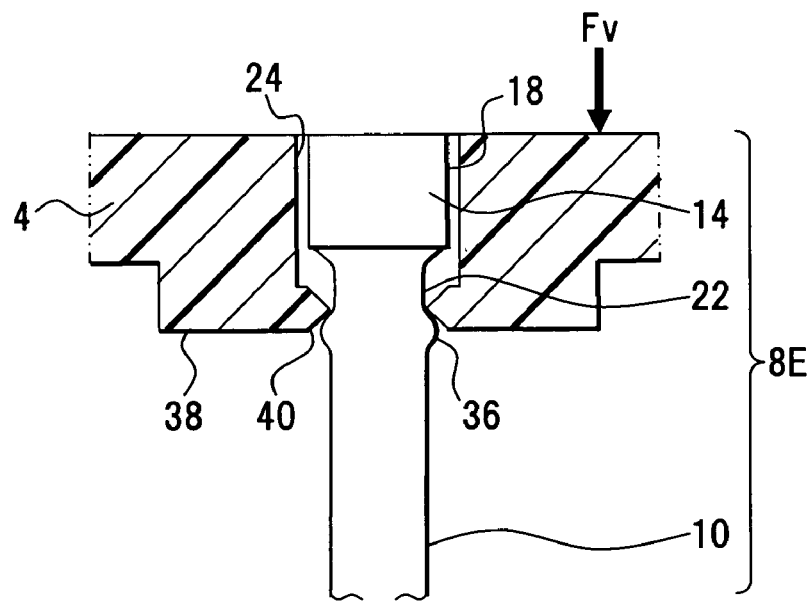
FIGS. 16A and 16B show detection operation of external force.
Figure 16B:
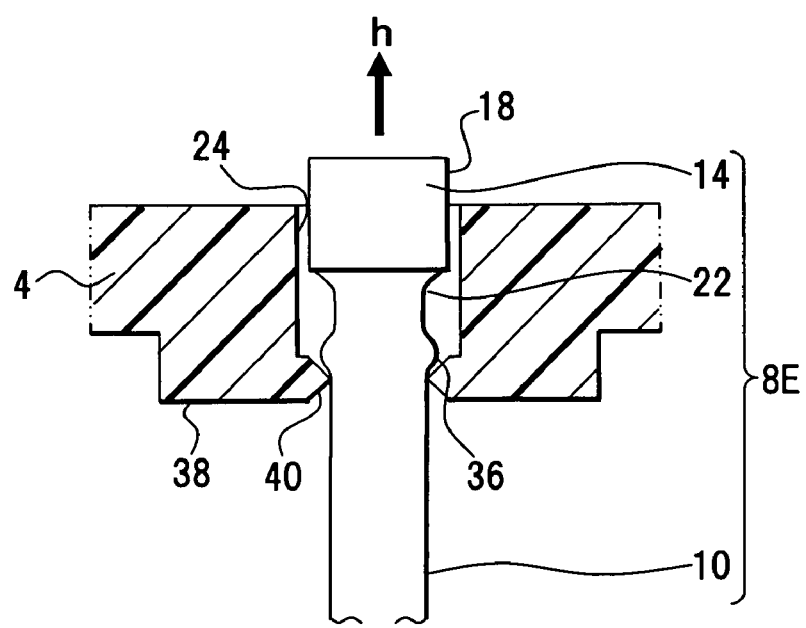

A seventh embodiment of the present invention will be described with reference to FIGS. 15, 16A and 16B. FIG. 15 is a sectional view showing external force detection structure using another external force detector and FIGS. 16A and 16B show external force detection operation. In FIG. 15, the same components as described in FIG. 1 are denoted by the same reference numerals.

In an external force detector 8E, a body section 10 is formed thinner than a head 14. A neck 22 that is thinner than the body section 10 is formed between the body section 10 and the head 14. A retaining part 36 that has a diameter longer than the neck 22 and is formed like a ringed sectional triangle is disposed at the body section 10 side. In this case, against an outside diameter R8 of the body section 10, an outside diameter R3 of the head 14 and the minimum diameter R4 of the neck 22, the magnitude relationship of an outside diameter R6 of the retaining part 36 is R4<R8<R6.

Toward such external force detector 8E, a thickness part 38 is formed at the part around a through hole 24 of the case 4. At an inside wall of the through hole 24, a projection 40 is formed at the position corresponding to the neck 22 of the external force detector 8E inserted into the through hole 24. If an inside diameter of the projection 40 is R7, R4<R7<R6<R3 is set. In case that external force exceeding an allowable limit operates on the neck 22, it is set that the external force detector 8E can jump out from the case 4.

According to such structure, although external force Fv operates on the case 4 by shocks such as a fall, if the external force Fv is within the allowable limit, as shown in FIG. 16A, the retaining part 36 hits at the projection 40 to avoid jumping out of the external force detector 8E. That is, a jumping out inhibit function that the projection 40 of the retaining part 36 has operates. In contrast, if the external force Fv exceeds the allowable limit, as shown in FIG. 16B, while the retaining part 36 pushes the projection 40 at the through hole 24 side away or destroys itself and the projection 40, the jumping out inhibit function of them is released and engagement thereof is tripped, then the external force detector 8E jumps out in the direction shown by an arrow h. As a result, it is understood that external force exceeding the allowable limit operates on a portable terminal device 2. Such jumping out inhibit function within the allowable limit of external force and jumping out of the external force detector 8E by external force exceeding the allowable limit are arbitrarily set by the length setting of R4<R8<R7<R6 and elasticity that formation material has.

Eighth Embodiment

Figure 17:
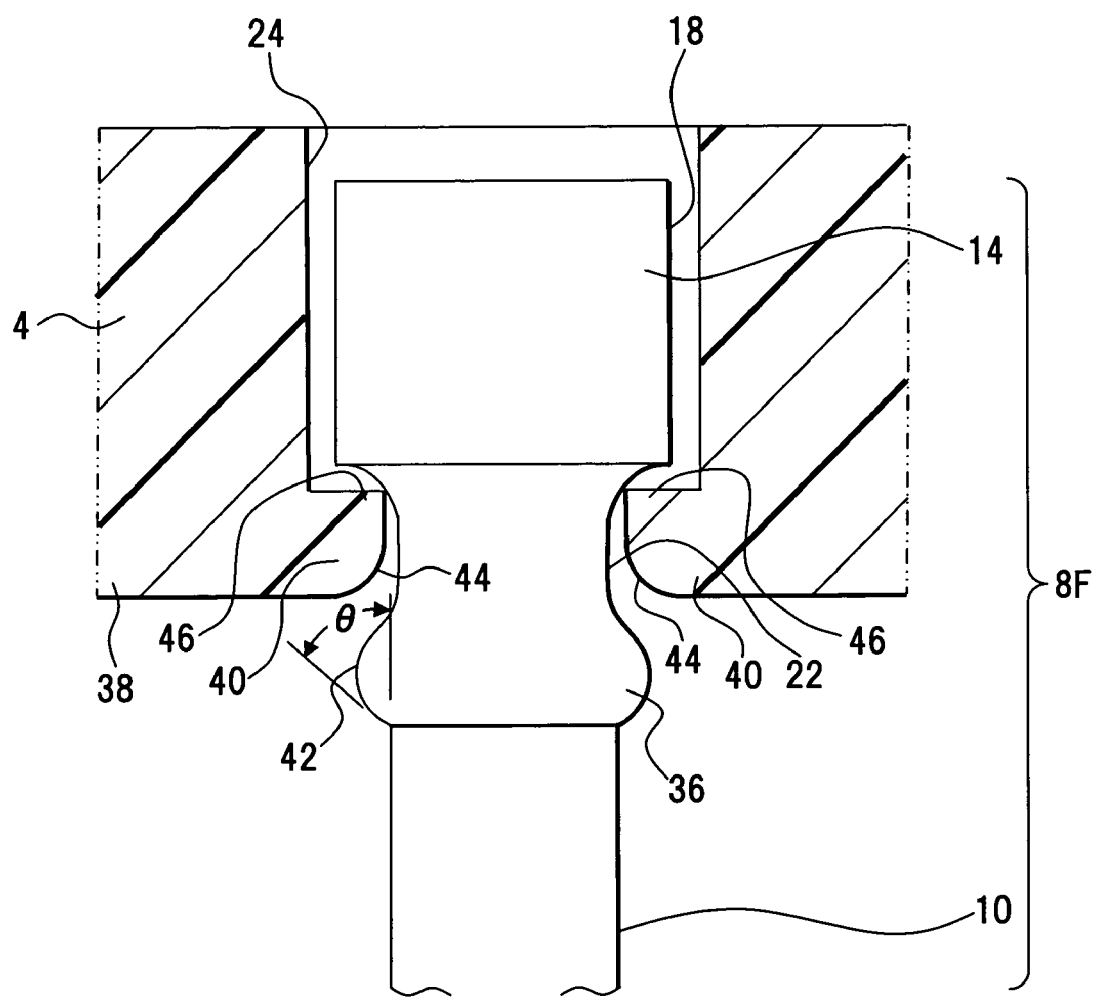
FIG. 17 shows external force detection structure using an external force detector according to an eighth embodiment.
Figure 18A:
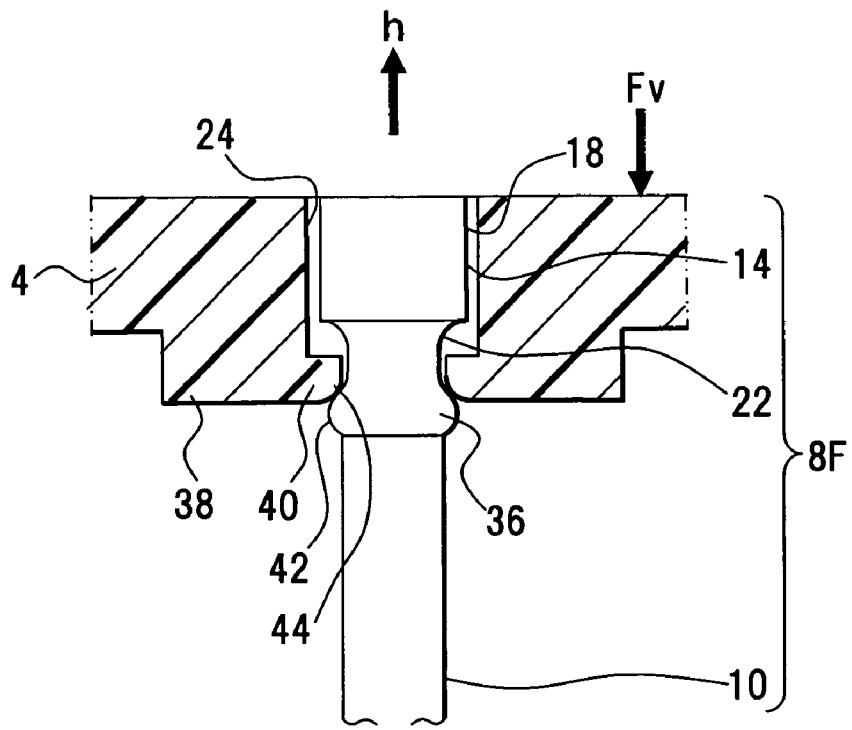
FIGS. 18A and 18B show detection operation of external force.
Figure 18B:
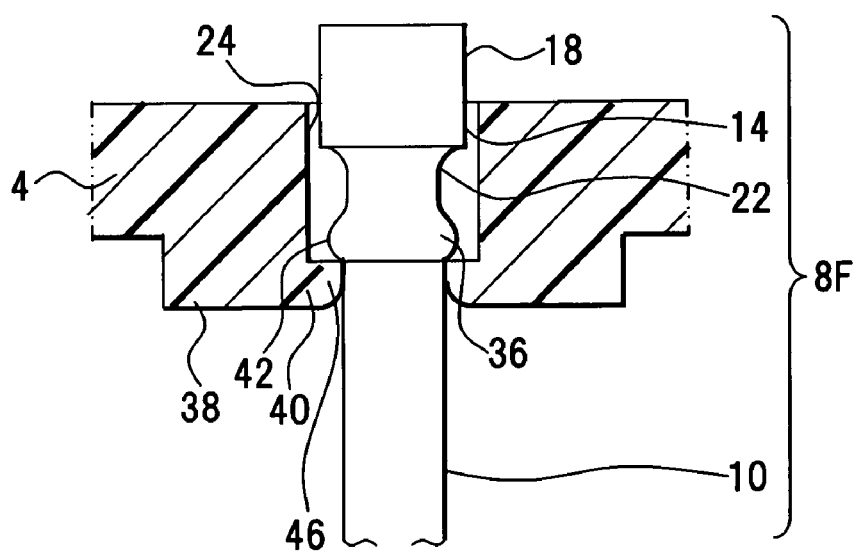

An eighth embodiment of the present invention will be described with reference to FIGS. 17, 18A and 18B. FIG. 17 shows external force detection structure using another external force detector and FIGS. 18A and 18B show operation thereof. In FIGS. 17, 18A and 18B, the same components as described in FIG. 16 are denoted by the same reference numerals.

This external force detection structure receives external force exceeding an allowable limit to make an external force detector 8F jump out from a case 4, and prevents the external force detector 8F once separated from the case 4 from returning to the case 4. That is, in the external force detection structure, a rising angle θ at a body section 10 of a retaining part 36 formed in the external force detector 8F is set large. A tip side of the retaining part 36 is defined as a bent surface 42. A bent surface 44 is formed at the bottom surface of the projection 40 and a corner 46 is formed at the top surface thereof. In order to prevent the external force detector 8F, which detected force and jumped out from the case 4, from returning to the case 4, the retaining part 36 having an angle θ corresponding to the corner 46 of the projection 40 is formed as an insertion stop section.

According to such structure, if external force Fv that exceeds the allowable limit operates on the case 4, the external force detector 8F jumps outside through into a gap of the projection 40 as shown in FIG. 18A since a jumping out inhibit function by friction force between the bent surfaces 42 and 44 is weak. From the jumping out, it is recognized that the external force Fv exceeding the allowable limit has operated on the case 4.

If the jumped-out external force detector 8F is tried to be returned into the case, as shown in FIG. 18B, a rising part of the retaining part 36 hits at the corner 46 of the projection 40 and insertion of the external force detector 8F is blocked. If the external force detector 8F is pushed in forcibly, there is a risk that the projection 40 is damaged. Thus, injustice such as smoothing the aspects thereof can be avoided and external force detection is not intervened.

Ninth Embodiment

Figure 19:
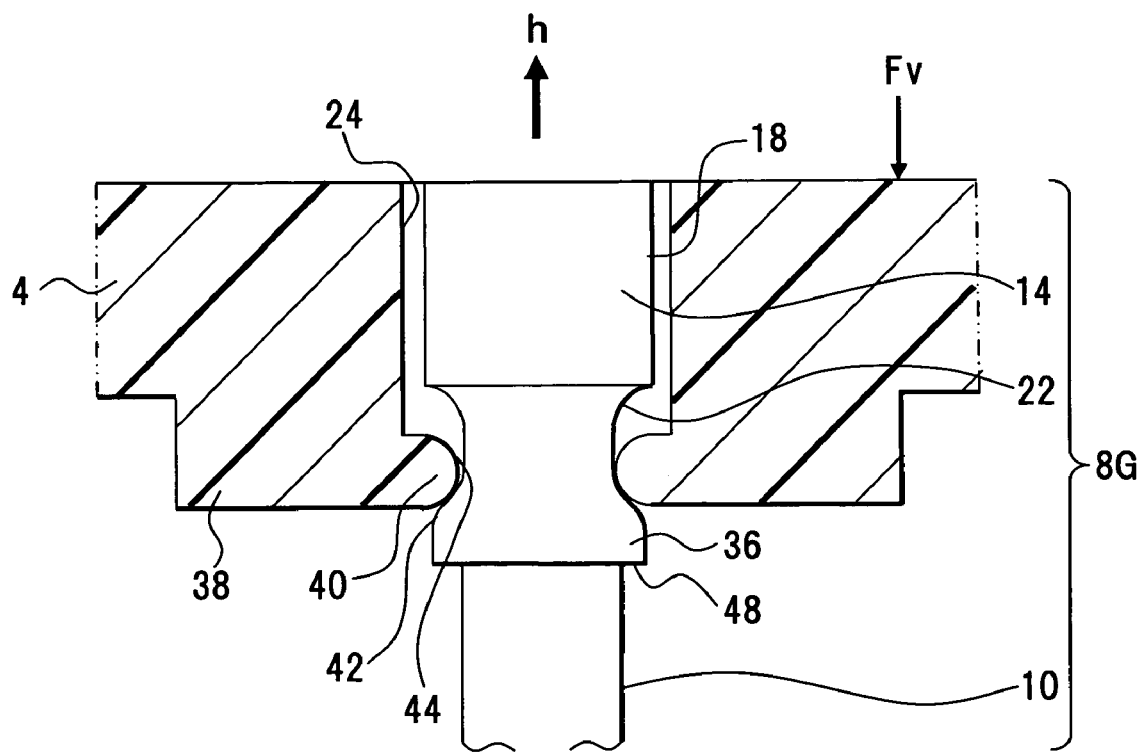
FIG. 19 shows external force detection structure using an external force detector according to a ninth embodiment.
Figure 20:
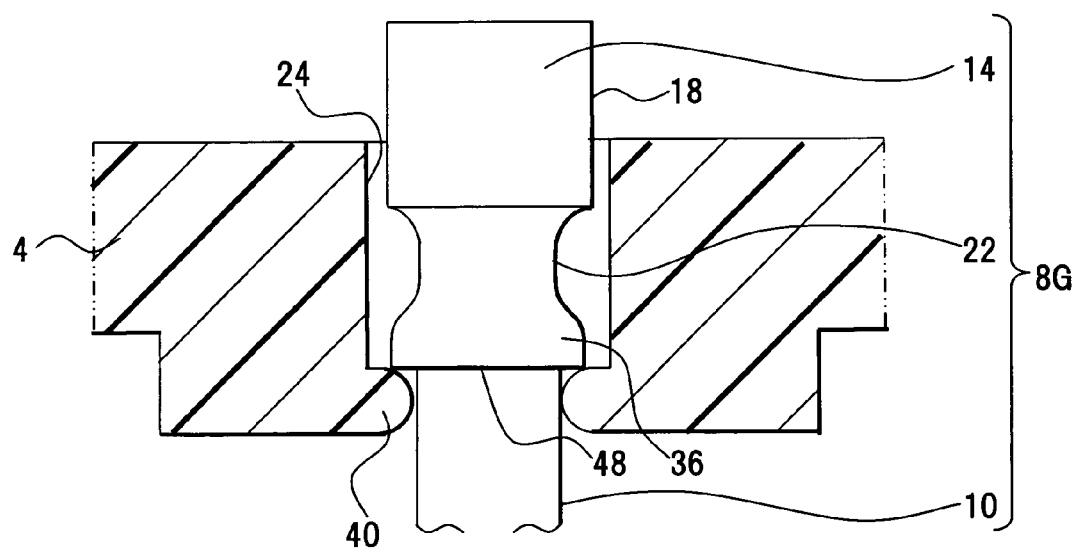
FIG. 20 shows an insertion inhibit function of a stopper in an external force detector.

A ninth embodiment of the present invention will be described with reference to FIGS. 19 and 20. FIG. 19 shows enlarged external force detection structure using another external force detector and FIG. 20 shows operation thereof. In FIGS. 19 and 20, the same components as described in FIG. 17 are denoted by the same reference numerals.

This external force detection structure, as well as the eighth embodiment, receives external force exceeding an allowable limit to make an external force detector 8G jump out from a case 4, and prevents the external force detector 8G once separated from the case 4 from returning to the case 4. Therefore, in the retaining part 36 of the external force detector 8G, a stopper 48 made of a step is formed. In this case, a projection 40 is a sectional semicircle having a bent surface part 44 to enable the detector 8G to jump out. The stopper 48 formed in the retaining part 36 is an insertion inhibit section to prevent the external force detector 8G, which detected external force and jumped out from the case 4, from returning to the case 4. In this case, the stopper 48 at the external force detector 8G hits at the projection 40 at the case 4 side to attempt to block insertion of the external force detector 8G.

According to such structure, if external force Fv exceeding the allowable limit operates on the case 4, the external force detector 8G jumps outside through into a gap of the projection 40 since a jumping out inhibit function by friction force between the bent surfaces 42 and 44 is weak. As described above, from the jumping out, it is recognized that the external force Fv exceeding the allowable limit has operated on the case 4 (FIG. 18A).

If the jumped-out external force detector 8G is tried to be returned into the case, as shown in FIG. 20, the stopper 48 of the retaining part 36 hits at the projection 40 and insertion of the external force detector 8G is blocked. If the external force detector 8G is pushed in forcibly, there is a risk that the projection 40 is damaged. Thus, injustice such as smoothing the aspects thereof can be avoided and external force detection is not intervened as well as the above embodiment.

Tenth Embodiment

Figure 21:
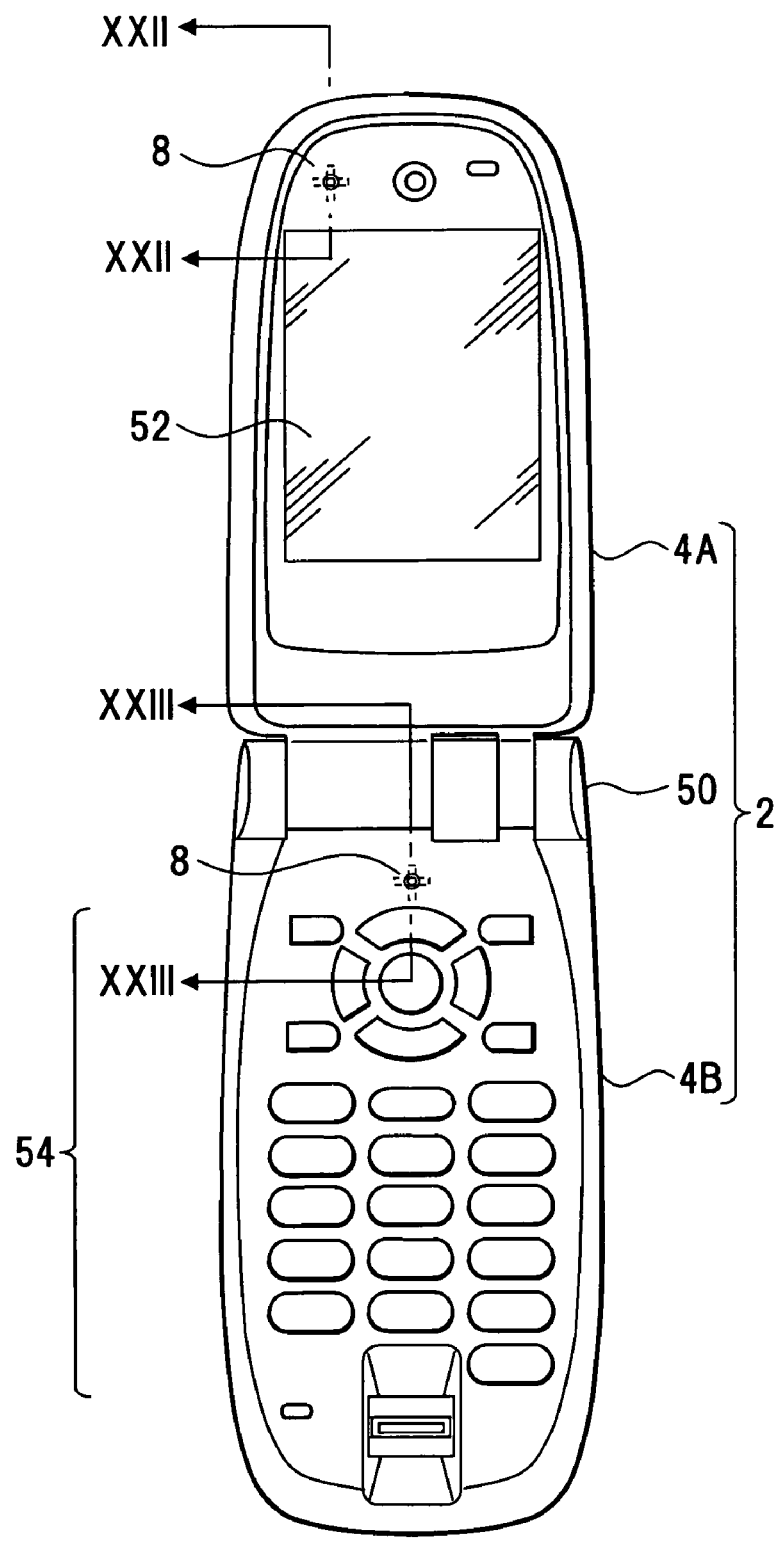
FIG. 21 shows a portable terminal device using an external force detector according to a tenth embodiment.
Figure 22:
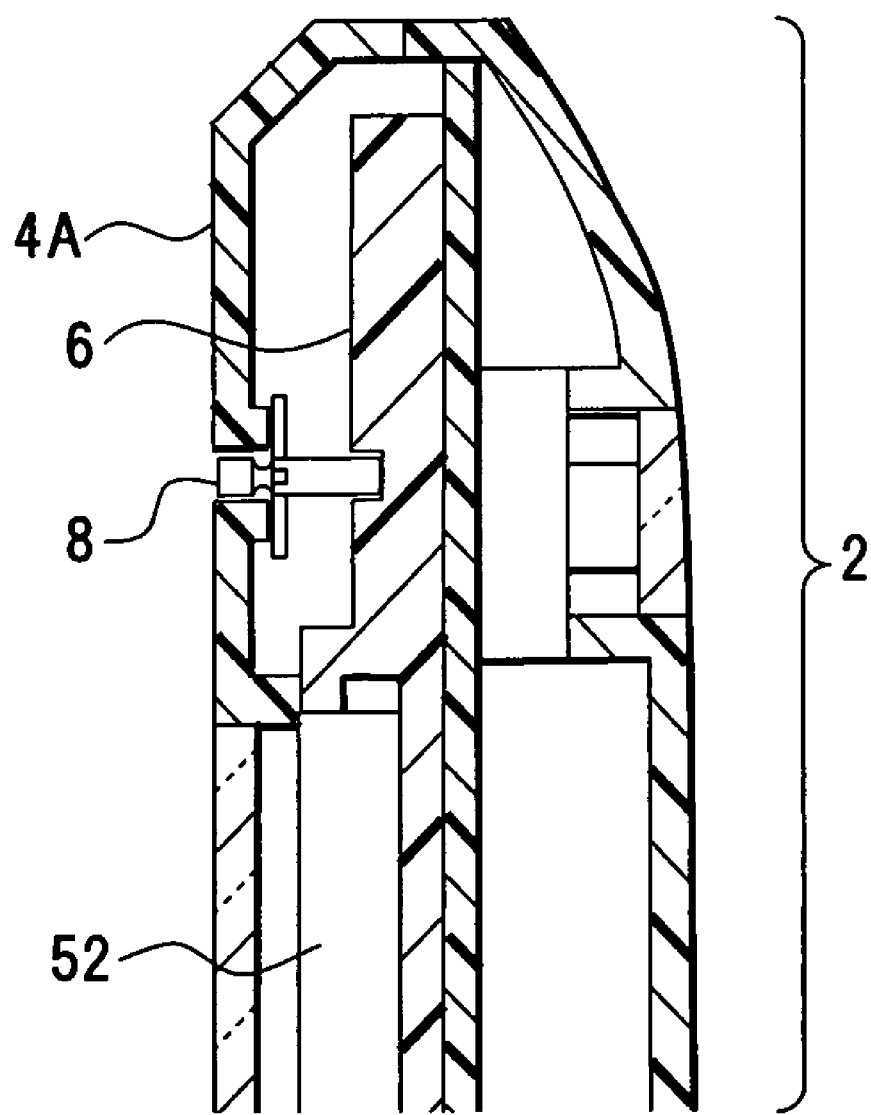
FIG. 22 is a sectional view of FIG. 21 along an XXII-XXII line.
Figure 23:
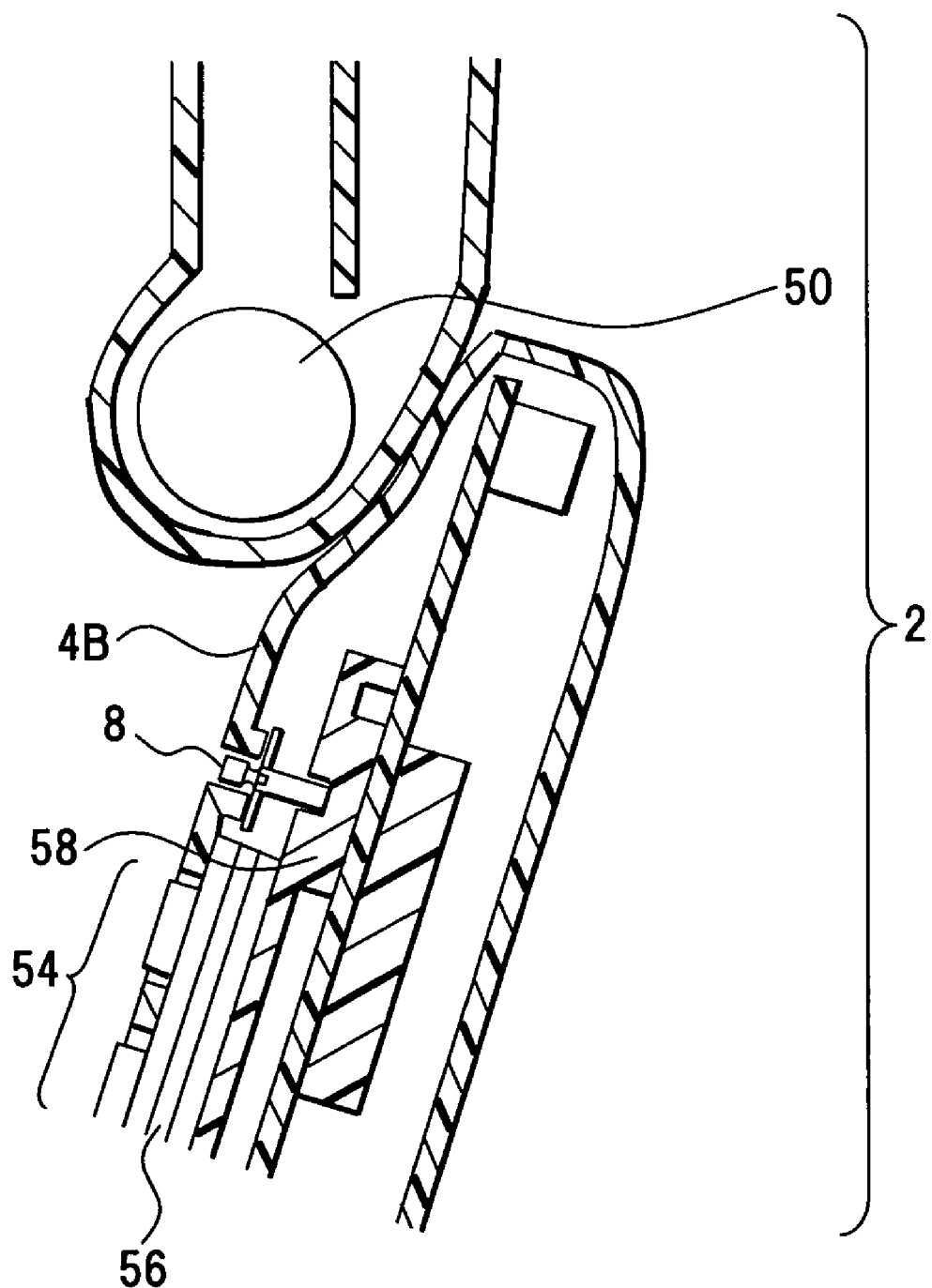
FIG. 23 is a sectional view of FIG. 21 along an XXIII-XXIII line.

A tenth embodiment of the present invention will be described with reference to FIGS. 21, 22 and 23. FIG. 21 shows a cellular phone device including external force detection structure, FIG. 22 is a sectional view of FIG. 21 along an XXII-XXII line and FIG. 23 is a sectional view of FIG. 21 along an XXIII-XXIII line. In FIGS. 21 to 23, the same components as described in FIG. 1 are denoted by the same reference numerals.

This portable terminal device 2 is, as an example of an electronic device having external force detection structure, structured that a first case 4A (corresponding to the case 4 in FIG. 1) is composed to be able to open and close with a second case 4B via a hinge 50. LCD 52 as a display section is disposed at the case 4A. An external force detector 8 is disposed at the position adjacent to LCD 52. A key operation unit 54, etc. including a plurality of keys such as a numeric keypad and cursor keys, and the external force detector 8 are disposed on the case 4B.

As shown in FIG. 22, the external force detector 8 is disposed between the case 4A and an LCD holder 6 at the case 4A. Details thereof are as described before with reference to FIGS. 1 to 7, etc. The description thereof is omitted.

As shown in FIG. 23, the external force detector 8 is disposed between the case 4B and a switch holder 58 retaining a dome switch 56 at the case 4B. Details thereof are as described before with reference to FIGS. 1 to 8, etc. The description thereof is omitted.

According to such structure, in case external force is applied to the portable terminal device 2 by fall shocks or a press, etc., if the external force exceeds an allowable limit of external force detection structure including the external force detector 8 of the case 4A and case 4B, as described above, external force in the width direction applied to the case 4A and case 4B and a loading history thereof can be recognized by jumping out based on fracture of the head 14 of the external force detector 8 (FIGS. 3 and 4) and the fracture surface 26 thereof (FIG. 7). External force in the perpendicular direction applied to the case 4A and the case 4B and a loading history thereof can be recognized by jumping out of the external force detector 8 (FIGS. 5 and 6) and the fracture surfaces 28 thereof (FIG. 8). That is, if failure occurs in the portable terminal device 2, whether the failure results from an electric system or from external force can be easily determined based on such recognition of a loading history.

In this embodiment, the described external force detectors 8A (FIG. 9), 8B (FIG. 10), 8C (FIG. 11), 8D (FIG. 13), 8E (FIG. 15), 8F (FIG. 17) and 8G (FIG. 19) can be used in the external force detector 8.

Eleventh Embodiment

Figure 24:
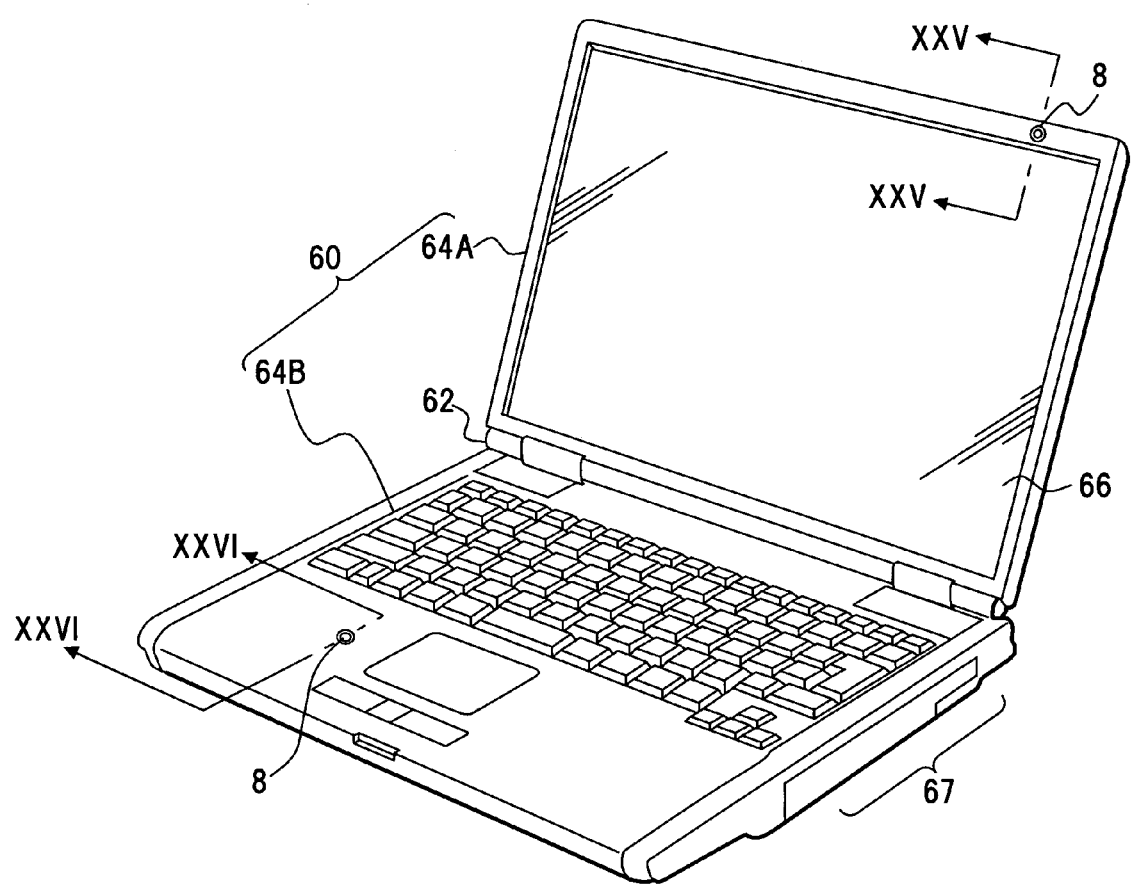
FIG. 24 shows a notebook computer using an external force detector according to an eleventh embodiment.
Figure 25:
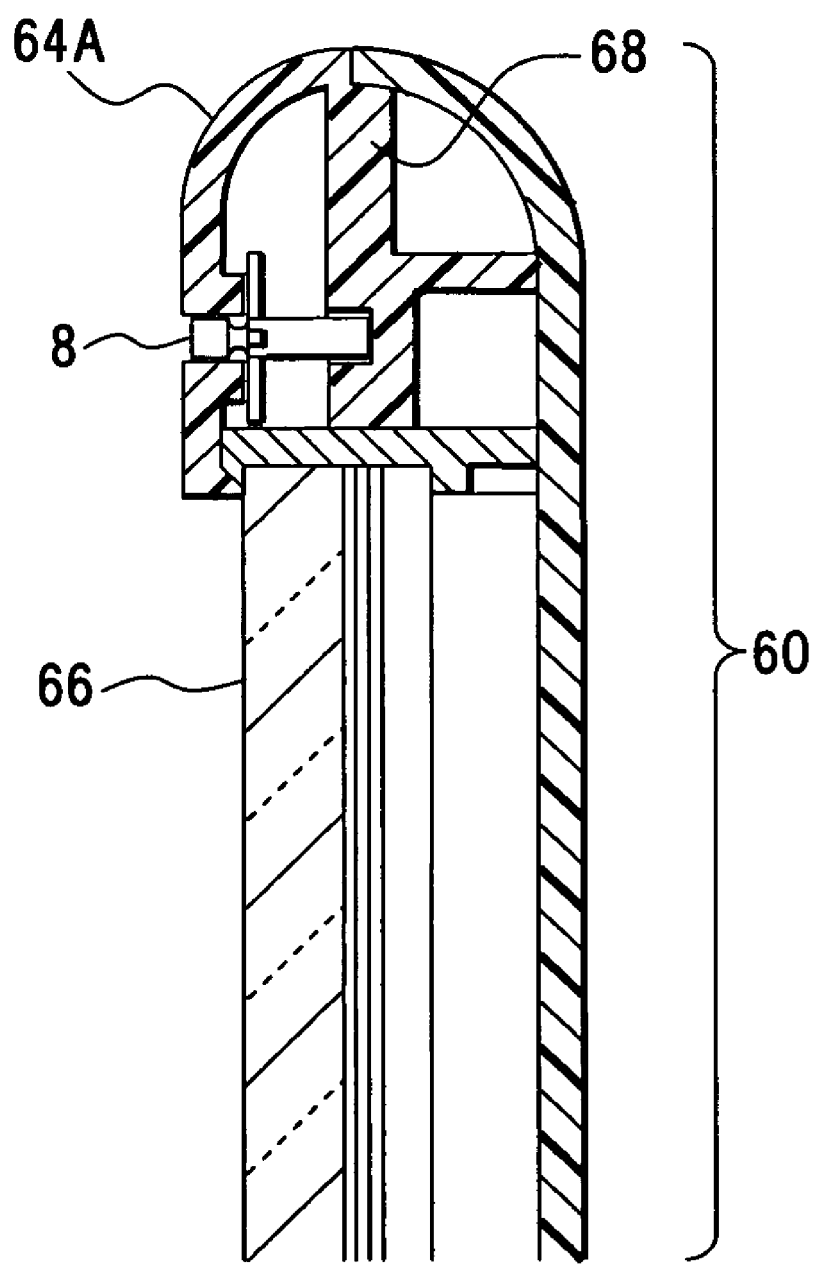
FIG. 25 is a sectional view of FIG. 24 along an XXV-XXV line.
Figure 26:
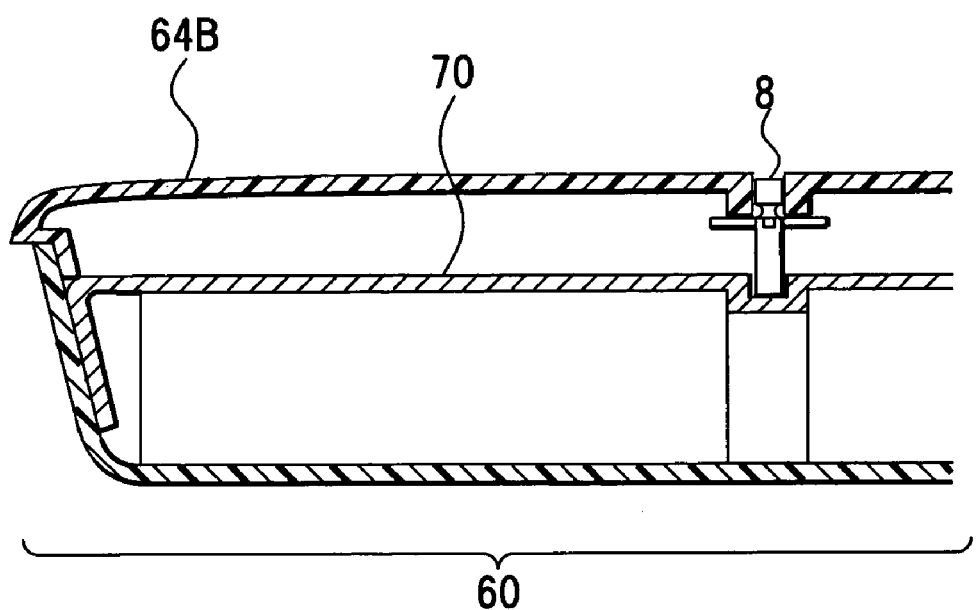
FIG. 26 is a sectional view of FIG. 24 along an XXVI-XXVI line.

An eleventh embodiment of the present invention will be described with reference to FIGS. 24, 25 and 26. FIG. 24 shows a notebook computer including external force detection structure, FIG. 25 is a sectional view of FIG. 24 along an XXV-XXV line and FIG. 26 is a sectional view of FIG. 24 along an XXVI-XXVI line. In FIGS. 24, 25 and 26, the same components as described in FIG. 1 are denoted by the same reference numerals.

This notebook computer (PC) 60 is, as an example of an electronic device having external force detection structure, structured that a first case 64A (corresponding to the case 4 in FIG. 1) is composed to be able to open and close with a second case 64B via a hinge 62. LCD 66 as a display section is disposed at the case 64A. An external force detector 8 is disposed at the position adjacent to the LCD 66. A key operation unit 67, etc. including a plurality of keys such as a numeric keypad and cursor keys, and the external force detector 8 are disposed on the case 64B.

As shown in FIG. 25, the external force detector 8 is disposed between the case 64A and an LCD holder 68 at the case 64A. Details thereof are as described before with reference to FIGS. 1 to 7, etc. The description thereof is omitted.

As shown in FIG. 26, the external force detector 8 is disposed between the case 64B and a holder 70 retaining members inside the case such as a switch at the case 64B. Details thereof are as described before with reference to FIGS. 1 to 8, etc. The description thereof is omitted.

According to such structure, in case external force is applied to the PC 60 by fall shocks or a press, etc., if the external force exceeds an allowable limit of external force detection structure including the external force detector 8 of the case 64A and case 64B, as described above, external force in the width direction applied to the case 64A and case 64B and a loading history thereof can be recognized by jumping out based on fracture of the head 14 of the external force detector 8 (FIGS. 3 and 4) and the fracture surface 26 thereof (FIG. 7). External force in the perpendicular direction applied to the case 64A and case 64B and a loading history thereof can be recognized by jumping out of the external force detector 8 (FIGS. 5 and 6) and the fracture surfaces 28 thereof (FIG. 8). That is, if failure occurs in the PC 60, whether the failure results from an electric system or from external force can be easily determined based on such recognition of a loading history.

Also in this embodiment, the described external force detectors 8A (FIG. 9), 8B (FIG. 10), 8C (FIG. 11), 8D (FIG. 13), 8E (FIG. 15), 8F (FIG. 17) and 8G (FIG. 19) can be used in the external force detector 8.

Figure 27:
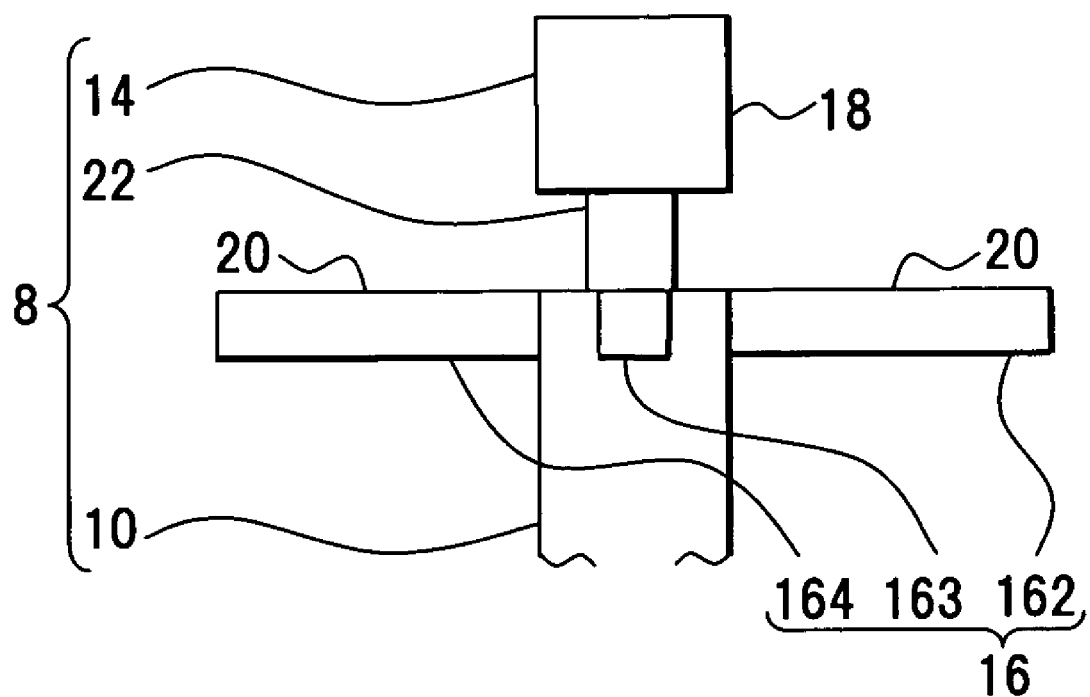
FIG. 27 shows another external force detector.

Other Embodiments (1) The neck 22 of the external force detectors 8, 8A, 8C, 8D, 8E, 8F and 8G may be a column having diameter shorter than that of the body section 10 or the head 14 as structure fractured by external force as shown in FIG. 27. The body section 10 or the head 14 may be a prism. The neck 22 may also be a prism. According to such structure, external force operates on the force receiving surface 18 of the head 14 to enable the head 22 to fracture by external force exceeding an allowable limit.

Figure 28:
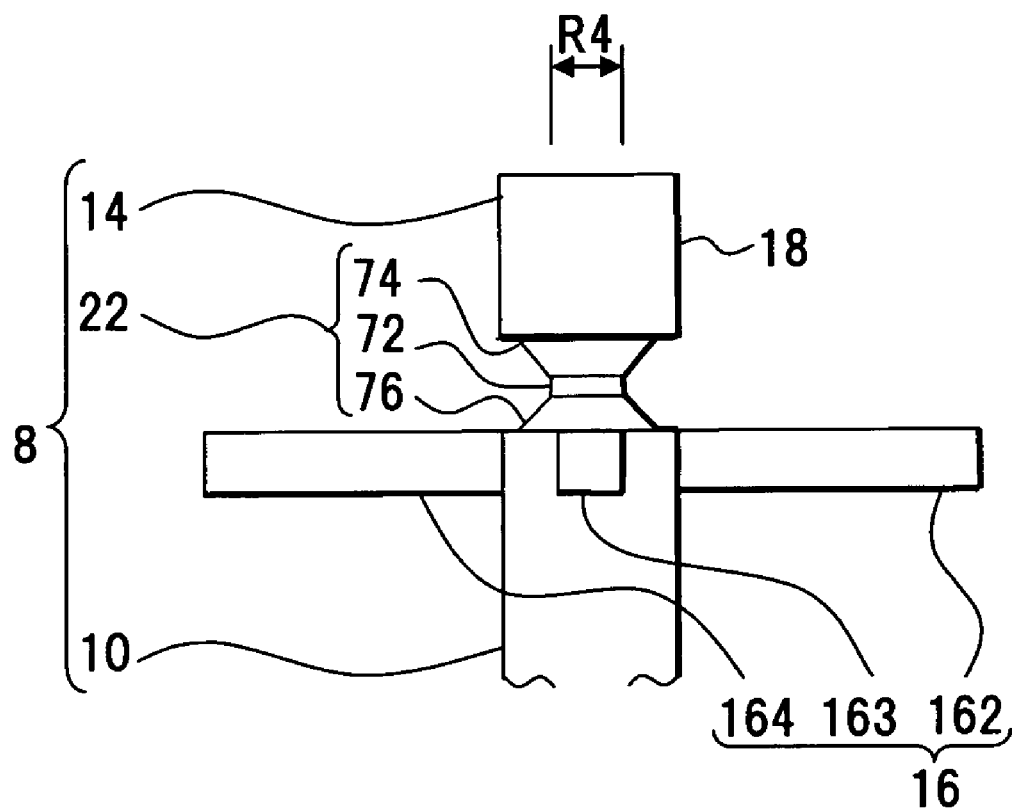
FIG. 28 shows another external force detector.

(2) The neck 22 may be composed of a column 72 whose minimum diameter is R4 and cones 74 and 76 that are sectional trapezoid as shown in FIG. 28. According to such structure, external force operates on the force receiving surface 18 of the head 14 to enable the head 22 to fracture by external force exceeding an allowable limit.

Figure 29:
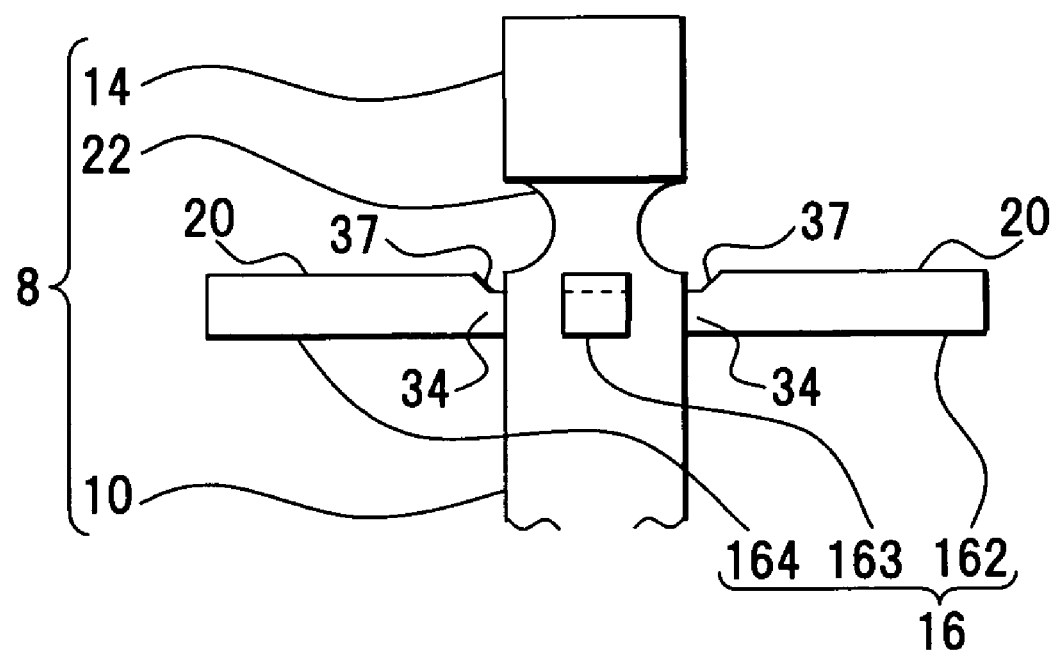
FIG. 29 shows another external force detector.

(3) The hollow sections 34 of the arms 161 to 164 of the external force detector 8C (FIG. 11) may be composed, as shown in FIG. 29, of the depression 37 formed at the root of each force receiving surface 20.

(4) In the above embodiments, four arms 161 to 164 are disposed. One or some arms selected from the arms 161 to 164 may be composed. Five and over arms may also be composed.

Figure 30:
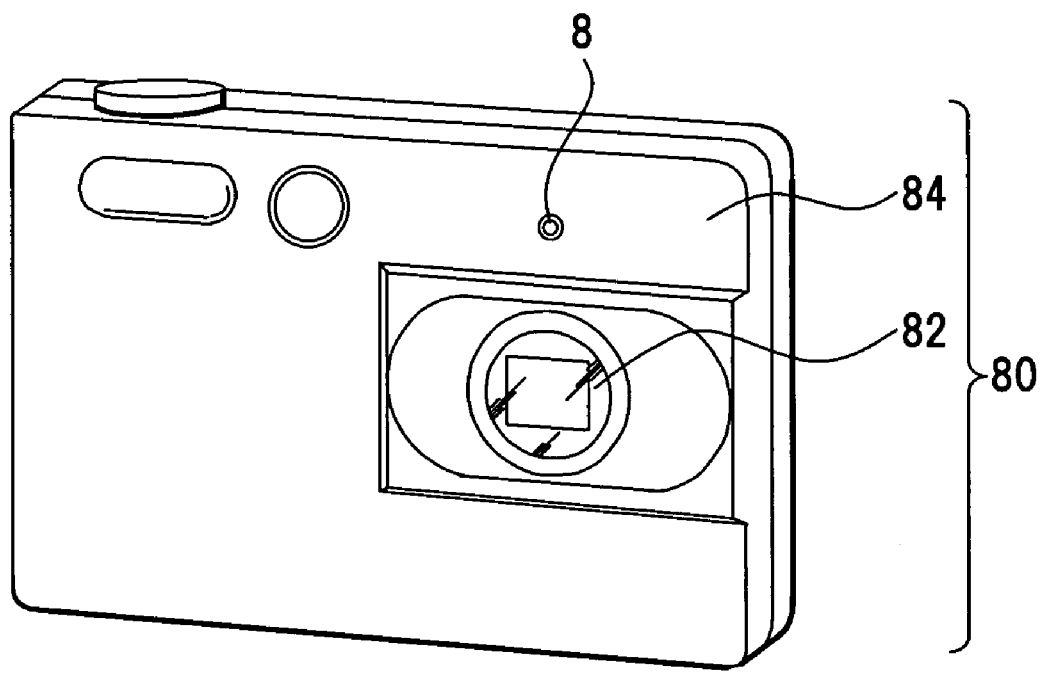
FIG. 30 shows an electronic device (digital camera) using an external force detector.
Figure 31:
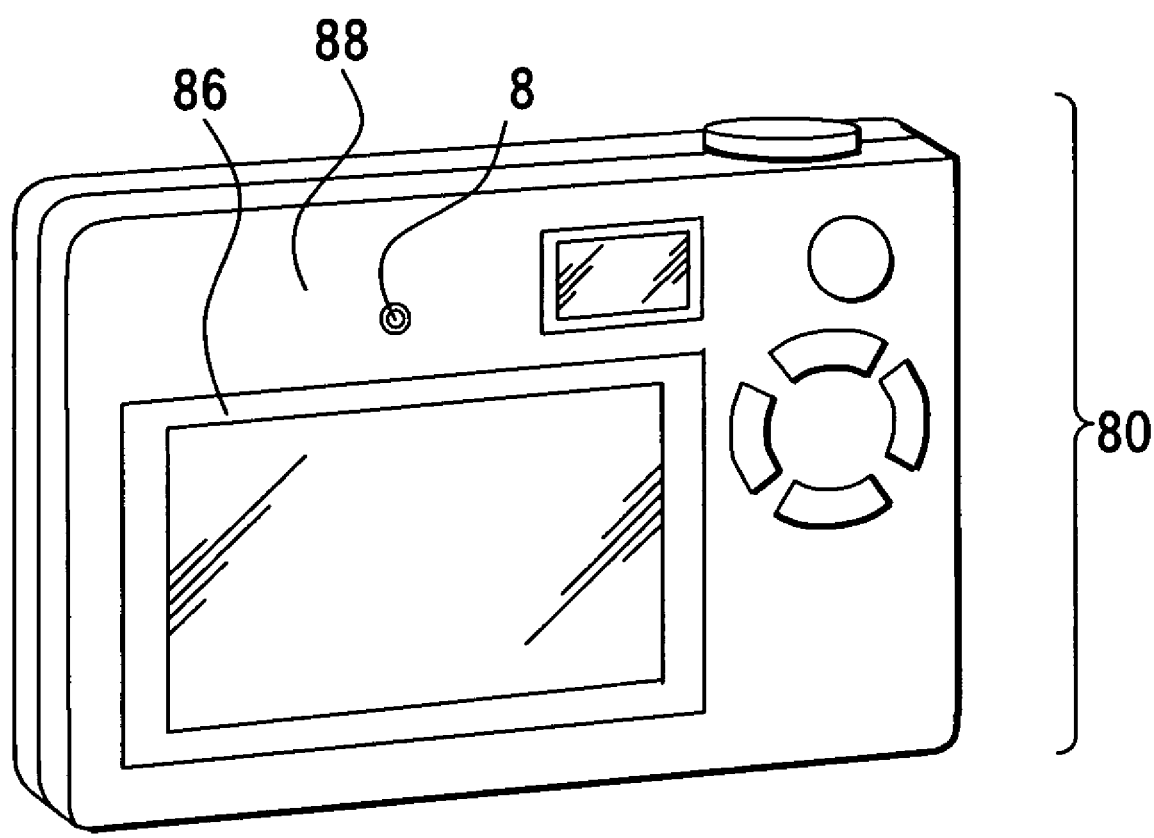
FIG. 31 shows an electronic device (digital camera) using an external force detector.
Figure 32:
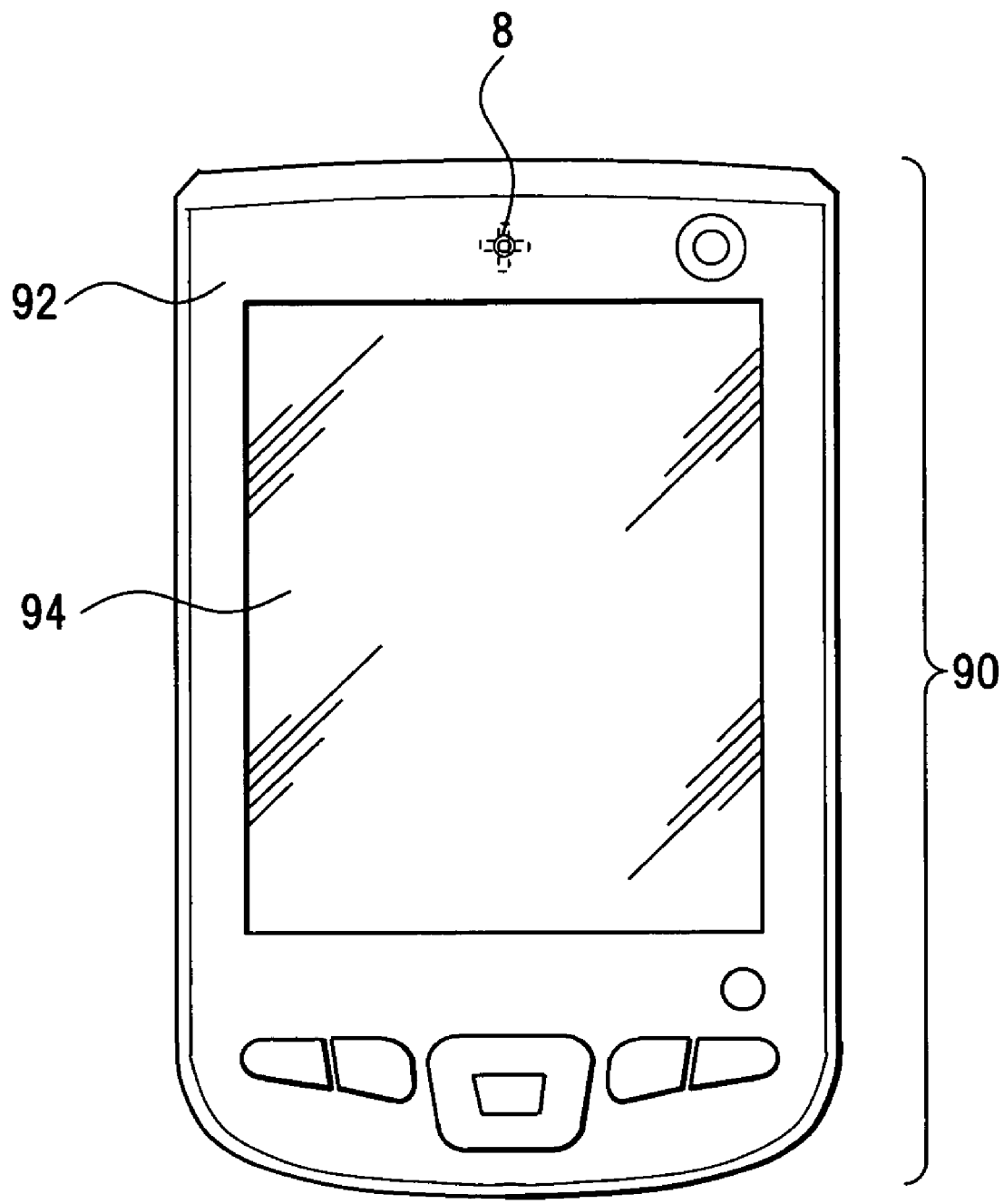
FIG. 32 shows an electronic device (personal digital assistance) using an external force detector.

(5) According to an electronic device applied to external force detection structure having the external force detector 8, 8A, 8B, 8C, 8D, 8E, 8F and 8G, the portable terminal device 2 (FIGS. 1 and 21) and PC 60 (FIG. 24) are exemplified. For example, as shown in FIG. 30, the external force detector 8 (or, the external force detector 8A, 8B, 8C, 8D, 8E, 8F or 8G) may be disposed between a case 84 having a lens mechanism 82 of a digital camera 80 (corresponding to the case 4 of FIG. 1) and inside members. For example, as shown in FIG. 31, the external force detector 8 (or, the external force detector 8A, 8B, 8C, 8D, 8E, 8F or 8G) may be disposed between the LCD holder (6) and a case 88 where a display (LCD) 86 of the digital camera 80 is disposed. For example, as shown in FIG. 32, the external force detector 8 (or, the external force detector 8A, 8B, 8C, 8D, 8E, 8F or 8G) may be disposed between a case 92 of a Personal Digital Assistant (PDA) 90 (corresponding to the case 4 in FIG. 1) and the LCD holder (6) of LCD 94. According to such structure, if failure occurs in these electronic devices, loading histories thereof are recognized by fracture or jumping-out of the external force detectors 8. Based on the recognition, whether the failure results from an electric system or from external force can be easily determined.

While the most preferred embodiments of the present invention have been described, the description is not intended to limit the present invention. Various modifications and revisions of the embodiments can be made by those skilled in the art in accordance with the points and gist of the invention that are described in the claims or disclosed in the specification. These modifications and revisions surely fall within the true scope of the present invention.

The present invention can recognize loading external force such as fall shocks and a press applied to an electronic device, etc. or a loading history thereof without disassembly of a case of the electronic device, etc. It can be used for the determination that in case of failure, whether the failure results from loading external force or from the abnormality of an electric system. Thus, the present invention has usefulness.

What is claimed is:

1. An external force detector that detects a loading history due to external force which exceeds an allowable limit, the detector comprising:
   a body section, disposed between a first member and a second member opposing to the first member, that is supported by one of the first member and the second member; and
   a force receiving section, provided projectively at the body section, that is deformed when the external force, which acts upon in a direction intersecting with a direction of a space between the first member and the second member, exceeds the allowable limit;
   wherein at least the force receiving section separates from the first and second members by deformation of the force receiving section when the external force exceeds the allowable limit.

2. The external force detector of claim 1, wherein the first member includes a through section, and the body section slips out of the through section.

3. The external force detector of claim 1, comprising:
   a through section, formed in the first member, through which the body section passes; and
   an insertion inhibit section which inhibits another insertion of the body section to the through section.

4. The external force detector of claim 1, wherein a fracture surface of the body section or the force receiving section is a color which is different from a color of an outside surface of the first member, the body section or a head of the external force detector.

5. The external force detector of claim 1, wherein the force receiving section includes a neck portion having a cross-sectional area which is smaller than that of the body section or the receiving section, and the allowable limit of fracture by the external force is set by the neck portion.

6. An external force detector that detects a loading history due to external force which exceeds an allowable limit, the detector comprising:
   a body section disposed between a first member and a second member opposing to the first member, that is supported by the second member; and
   a force receiving section, provided projectively at the body section, that is deformed when the external force, which acts upon in a direction intersecting with a direction of a space between the first member and the second member, exceeds the allowable limit;
   wherein at least the body section separates from the first and second members by deformation of the force receiving section when the external force exceeds the allowable limit.

7. The external force detector of claim 6, wherein a hollow section is formed at the force receiving section, and the allowable limit is set based on the external force which fractures the hollow section.

8. An electronic device including an external force detector that detects a loading history due to external force which exceeds an allowable limit, the detector comprising:
   a body section, disposed between a first member and a second member opposing to the first member, that is supported by the first member; and
   a force receiving section, provided projectively at the body section, that is deformed when the external force, which acts upon in a direction intersecting with a direction of a space between the first member and the second member, exceeds the allowable limit;
   wherein at least the force receiving section separates from the first and second members by deformation of the force receiving section when the external force exceeds the allowable limit.

9. The electronic device of claim 8, wherein the first member includes a through section, and the body section slips out of the through section.

10. The electronic device of claim 8, comprising:
    a through section, formed in the first member, through which the body section passes; and
    an insertion inhibit section which inhibits another insertion of the body section to the through section.

11. The electronic device of claim 8, wherein a fracture surface of the body section or the force receiving section is a color which is different from a color of an outside surface of the first member, the body section or the force receiving section.

12. The electronic device of claim 8, wherein the force receiving section includes a neck portion having a cross-sectional area which is smaller than that of the body section or the receiving section, and the allowable limit of fracture by the external force is set by the neck portion.

13. An electronic device including an external force detector that detects a loading history due to external force which exceeds an allowable limit, the detector comprising:
    a body section, disposed between a first member and a second member opposing to the first member, that is supported by the second member; and
    a force receiving section, provided projectively at the body section, that is deformed when the external force, which acts upon in a direction intersecting with a direction of a space between the first member and the second member, exceeds the allowable limit;

wherein at least the body section separates from the first and second members by deformation of the force receiving section when the external force exceeds the allowable limit.

14. The electronic device of claim 13, wherein a hollow section is formed at the force receiving section, and the allowable limit is set based on the external force which fractures the hollow section.

15. The electronic device of claim 13, wherein a fracture surface of the force receiving section is a color which is different from a color of an outside surface of the first member, the body section or the force receiving section.

\* \* \* \* \*